(12) United States Patent
Chugh

(10) Patent No.: US 12,154,181 B2
(45) Date of Patent: Nov. 26, 2024

(54) SOCIAL NETWORK FOR MERCHANTS

(71) Applicant: Block, Inc., San Francisco, CA (US)

(72) Inventor: Deeksha Chugh, Freemont, CA (US)

(73) Assignee: Block, Inc., Oakland, CA (US)

(*) Notice: Subject to any disclaimer, the term of this patent is extended or adjusted under 35 U.S.C. 154(b) by 0 days.

(21) Appl. No.: 17/944,098

(22) Filed: Sep. 13, 2022

(65) Prior Publication Data

US 2023/0020864 A1 Jan. 19, 2023

Related U.S. Application Data

(63) Continuation of application No. 15/885,716, filed on Jan. 31, 2018, now Pat. No. 11,488,263.

(51) Int. Cl.
*G06Q 50/00* (2024.01)
*G06Q 20/10* (2012.01)
*G06Q 20/20* (2012.01)

(52) U.S. Cl.
CPC ............. *G06Q 50/01* (2013.01); *G06Q 20/10* (2013.01); *G06Q 20/202* (2013.01)

(58) Field of Classification Search
CPC ...... G06Q 50/01; G06Q 20/10; G06Q 20/202; G06Q 20/384; H04L 63/104
See application file for complete search history.

(56) References Cited

U.S. PATENT DOCUMENTS

| | | | |
|---|---|---|---|
| 6,177,932 B1 | 1/2001 | Galdes et al. | |
| 7,889,666 B1 | 2/2011 | Pei et al. | |
| 8,856,235 B2 | 10/2014 | Zhou et al. | |
| 8,935,192 B1 | 1/2015 | Ventilla et al. | |
| 9,069,737 B1 | 6/2015 | Kimotho et al. | |
| 9,135,559 B1 | 9/2015 | Chan et al. | |
| 9,935,129 B2 * | 4/2018 | Takahashi | G09G 3/3291 |

(Continued)

FOREIGN PATENT DOCUMENTS

DE 112012001675 T5 1/2014

OTHER PUBLICATIONS

Anonymous, "Nuance Introduces Nina Coach to Train and Deploy the New Generation of Human-Assisted Virtual Assistants Powered by Artificial Intelligence: Nina Coach Fosters a Smarter Virtual Assistant at a Faster Time to Market Leveraging AI and Hidden Agents," NASDAQ OMX's News, (Jun. 20, 2017), pp. 1-2.

(Continued)

*Primary Examiner* — Florian M Zeender
*Assistant Examiner* — Milena Racic
(74) *Attorney, Agent, or Firm* — Lee & Hayes, P.C.

(57) ABSTRACT

A social network for merchants is described. A payment processing service can receive first merchant information associated with characteristic(s) of a first merchant and second merchant information associated with characteristic(s) of a second merchant. The payment processing service can determine a similarity between the first merchant and the second merchant based on analyzing the first merchant information and the second merchant information with a data model. Based at least in part on the similarity, the payment processing service can associate the first merchant and the second merchant with a merchant group and enable the first merchant and the second merchant to access a service associated with a merchant social network based at least in part on the association with the merchant group.

20 Claims, 6 Drawing Sheets

(56) References Cited

U.S. PATENT DOCUMENTS

| | | | |
|---|---|---|---|
| 9,971,830 | B2 | 5/2018 | Jackson et al. |
| 10,068,215 | B1 | 9/2018 | Rosenthal et al. |
| 10,235,682 | B2 * | 3/2019 | Jouhikainen ....... G06Q 30/0201 |
| 10,460,310 | B2 * | 10/2019 | Phipps ............... G06Q 30/0631 |
| 10,460,324 | B1 | 10/2019 | Westen |
| 10,469,275 | B1 * | 11/2019 | Broomall ................ H04L 51/52 |
| 10,607,204 | B2 | 3/2020 | Rosenthal et al. |
| 11,093,553 | B2 | 8/2021 | Potiagalov et al. |
| 11,488,263 | B1 | 11/2022 | Chugh |
| 11,677,710 | B2 * | 6/2023 | Perry ...................... H04L 51/52 |
| | | | 709/206 |
| 2002/0174380 | A1 | 11/2002 | Mannarsamy |
| 2006/0259272 | A1 | 11/2006 | Sattler et al. |
| 2007/0143239 | A1 | 6/2007 | Boyle et al. |
| 2008/0294931 | A1 | 11/2008 | Bantz et al. |
| 2009/0157674 | A1 | 6/2009 | Curry |
| 2010/0082388 | A1 | 4/2010 | Dixit et al. |
| 2010/0100412 | A1 | 4/2010 | Cases et al. |
| 2011/0093327 | A1 | 4/2011 | Fordyce, III et al. |
| 2011/0178849 | A1 | 7/2011 | Rane et al. |
| 2012/0036015 | A1 | 2/2012 | Sheikh |
| 2012/0078751 | A1 | 3/2012 | MacPhail et al. |
| 2012/0216081 | A1 | 8/2012 | Duvvoori et al. |
| 2012/0239479 | A1 | 9/2012 | Amaro et al. |
| 2012/0246244 | A1 | 9/2012 | Mallet et al. |
| 2013/0006816 | A1 | 1/2013 | Nuzzi et al. |
| 2013/0036000 | A1 | 2/2013 | Giordano et al. |
| 2013/0046764 | A1 | 2/2013 | Choi et al. |
| 2013/0054480 | A1 | 2/2013 | Ross et al. |
| 2013/0282725 | A1 | 10/2013 | Rubinger |
| 2014/0022328 | A1 | 1/2014 | Gechter et al. |
| 2014/0052645 | A1 | 2/2014 | Hawes et al. |
| 2014/0280068 | A1 | 9/2014 | Dhoopar et al. |
| 2015/0030151 | A1 | 1/2015 | Bellini et al. |
| 2015/0310446 | A1 | 10/2015 | Tuchman et al. |
| 2015/0347156 | A1 | 12/2015 | Holt |
| 2018/0032890 | A1 | 2/2018 | Podgorny et al. |
| 2018/0063327 | A1 | 3/2018 | Eisner et al. |
| 2018/0365027 | A1 | 12/2018 | Khudia et al. |
| 2019/0130496 | A1 * | 5/2019 | Aroli Veettil .......... G06Q 20/12 |

OTHER PUBLICATIONS

"Are Schools Businesses?", Retreived from Internet URL: http://www.strategicedtech.com/blog/are-schools-businesses, Feb. 5, 2017, pp. 1-2.

"Small Business Trends: What is Machine Learning and How is it Changing Business?", Newstex Entrepreneurship Blogs, dated Nov. 7, 2016, pp. 1-3.

"Types and Forms of Business", Retreived from Internet URL: https://web.archive.org/web/20130121194038/https://www.accountingverse.conn/accounting-basics/types-of-businesses.html, Jan. 21, 2013, pp. 1-3.

Advisory Action mailed Jan. 26, 2022, for U.S. Appl. No. 15/967,505, of Nelson, J., et al., filed Apr. 30, 2018.

Advisory Action mailed Jan. 28, 2021, for U.S. Appl. No. 15/885,716, of Chugh, D., filed Jan. 31, 2018.

Advisory Action mailed May 6, 2022, for U.S. Appl. No. 15/885,716, of Chugh, D., filed Jan. 31, 2018.

Advisory Action mailed May 13, 2019, for U.S. Appl. No. 15/199,252, of Westen, P., filed Jun. 30, 2016.

Advisory Action mailed May 14, 2021, for U.S. Appl. No. 15/967,505, of Nelson, J., et al., filed Apr. 30, 2018.

Advisory Action mailed Oct. 21, 2020, for U.S. Appl. No. 15/967,505, of Nelson, J., et al., filed Apr. 30, 2018.

Final Action mailed Feb. 7, 2022, for U.S. Appl. No. 15/885,716, of Chugh, D., filed Jan. 31, 2018.

Final Office Action mailed Aug. 12, 2020, for U.S. Appl. No. 15/967,505, of Nelson, J., et al., filed Apr. 30, 2018.

Final Office Action mailed Dec. 21, 2017, for U.S. Appl. No. 14/541,115, of Rosenthal, N., et al., filed Nov. 13, 2014.

Final Office Action mailed Mar. 4, 2019, for U.S. Appl. No. 15/199,252, of Westen, P., filed Jun. 30, 2016.

Final Office Action mailed Mar. 8, 2021, for U.S. Appl. No. 15/967,505, of Nelson, J., et al., filed Apr. 30, 2018.

Final Office Action mailed Nov. 5, 2020, for U.S. Appl. No. 15/885,716, of Chugh, D., filed Jan. 31, 2018.

Final Office Action mailed Nov. 15, 2021, for U.S. Appl. No. 15/967,505, of Nelson, J., et al., filed Apr. 30, 2018.

Final Office Action mailed Nov. 18, 2016, for U.S. Appl. No. 14/541,115, of Rosenthal, N., et al., filed Nov. 13, 2014.

Non-Final Action mailed Jun. 11, 2021, for U.S. Appl. No. 15/967,505, of Nelson, J., et al., filed Apr. 30, 2018.

Non-Final Action mailed Jun. 23, 2021, for U.S. Appl. No. 15/885,716, of Chugh, D., filed Jan. 31, 2018.

Non-Final Action mailed Mar. 4, 2022, for U.S. Appl. No. 15/967,505, of Nelson, J., et al., filed Apr. 30, 2018.

Non-Final Office Action mailed Apr. 27, 2020, for U.S. Appl. No. 15/967,505, of Nelson, J., et al., filed Apr. 30, 2018.

Non-Final Office Action mailed Dec. 14, 2018, for U.S. Appl. No. 15/199,252, of Westen, P., filed Jun. 30, 2016.

Non-Final Office Action mailed Mar. 24, 2016, for U.S. Appl. No. 14/541,115, of Rosenthal, N., et al., filed Nov. 13, 2014.

Non-Final Office Action mailed May 1, 2020, for U.S. Appl. No. 15/885,716, of Chugh, D., filed Jan. 31, 2018.

Non-Final Office Action mailed May 15, 2017, for U.S. Appl. No. 14/541,115, of Rosenthal, N., et al., filed Nov. 13, 2014.

Non-Final Office Action mailed Nov. 16, 2020, for U.S. Appl. No. 15/967,505, of Nelson, J., et al., iled Apr. 30, 2018.

Non-Final Office Action mailed Sep. 6, 2019, for U.S. Appl. No. 16/120,177, of Smith, M., et al., filed Aug. 31, 2018.

Non-Final Office Action mailed Sep. 11, 2015, for U.S. Appl. No. 14/541,115, of Rosenthal, N., et al., filed Nov. 13, 2014.

Notice of Allowance mailed Jun. 12, 2019, for U.S. Appl. No. 15/199,252, of Westen, P., filed Jun. 30, 2016.

Notice of Allowance mailed Jun. 20, 2022, for U.S. Appl. No. 15/885,716, of Chugh, D., filed Jan. 31, 2018.

Notice of Allowance mailed May 2, 2018, for U.S. Appl. No. 14/541,115, of Rosenthal, N., et al., filed Nov. 13, 2014.

Notice of Allowance mailed Nov. 20, 2019, for U.S. Appl. No. 16/120,177, of Smith, M., et al., filed Aug. 31, 2018.

* cited by examiner

SOCIAL NETWORK FOR MERCHANTS

PRIORITY

This application is a continuation of, and claims priority to, U.S. patent application Ser. No. 15/885,716, filed on Jan. 31, 2018, and is fully incorporated by reference herein.

BACKGROUND

A merchant that is seeking assistance or advice for its business can visit a support website of a payment processing service whose services the merchant uses. At the support website, the merchant can browse or search posts by other merchants for relevant information. However, while the support website can provide a great deal of information, the information is not specific to the particular merchant that is seeking assistance. Additionally, if the merchant obtains information from the support website, the merchant has no way of knowing whether the information is credible.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
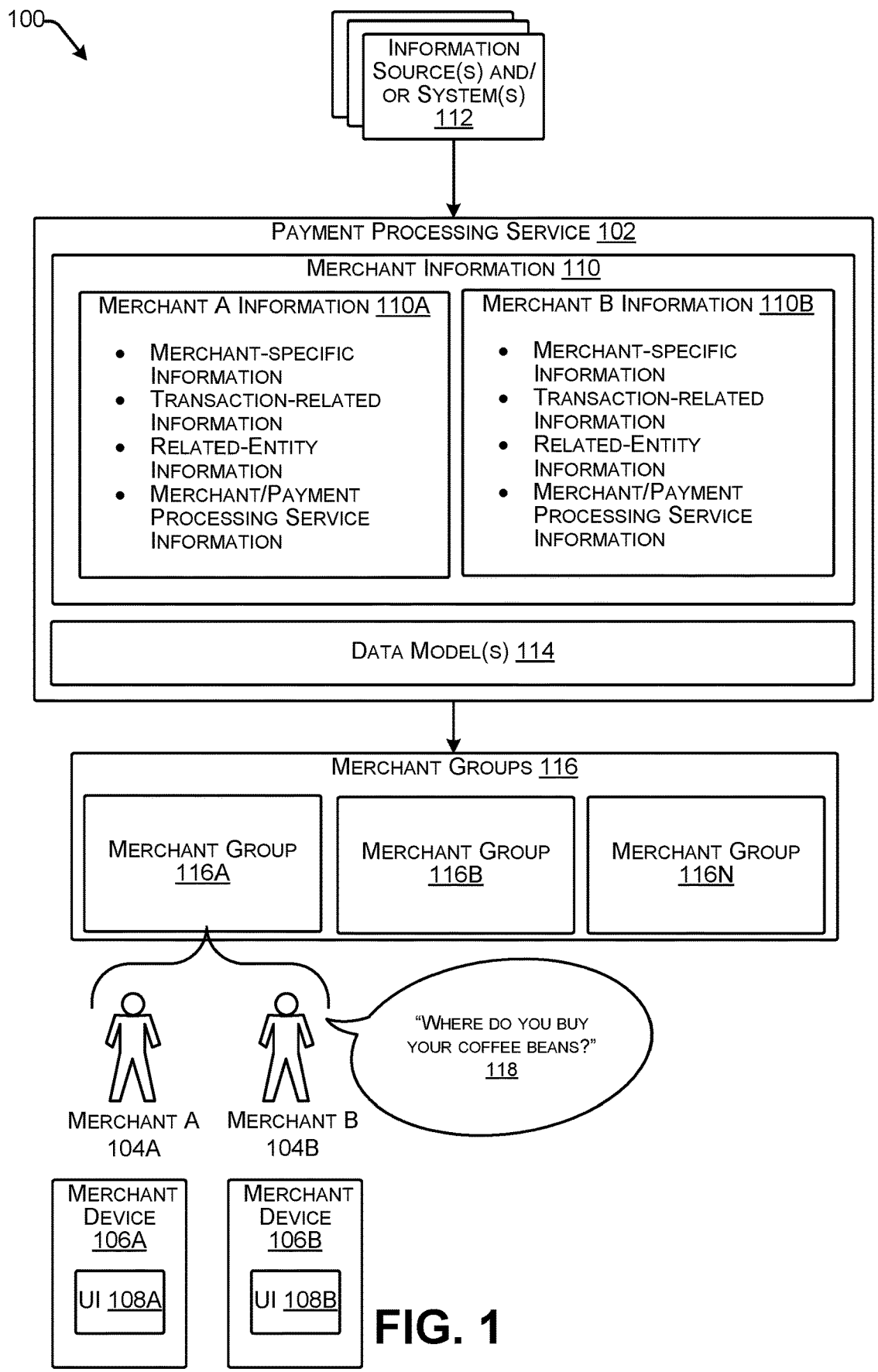
FIG. 1 illustrates an example process of forming and using a social network for merchants according to some implementations.

Techniques described herein are directed to a social network for merchants. For the purpose of this discussion, a merchant can be any entity that offers items (e.g., goods or services) for sale. In at least one example, a merchant can utilize a payment processing service that processes payments on behalf of the merchant. In at least one example, the payment processing service can additionally and/or alternatively provide payroll services, inventory management services, employee management services, financing services, appointment services, etc. for merchants. In at least one example, a merchant can desire to interact with other merchants associated with the payment processing service and/or agents of the payment processing service (e.g., support agents). Techniques described herein are directed to grouping merchants to enable merchants to interact with other similar merchants. Such grouping can enable merchants to access credible and/or relevant information from other similar merchants.

As described above, merchants who seek assistance or advice can visit support websites, which can include a page for merchants to ask and/or answer questions, post helpful tips, etc. However, the information posted to such pages is not specific to any particular merchant or merchant characteristic. For example, a merchant seeking information cannot determine whether a post or comment on a page was posted by a merchant that is nearby (if proximity is desired), or by a merchant that is in a similar business (if a merchant in a similar business is desired), or that a post is by a merchant at all. Thus, the merchant lacks reassurance that the information on the page can be trusted. Furthermore, existing techniques for connecting merchants have various limitations. For example, existing techniques for connecting merchants do not enable merchants to directly question (only) similar merchants (who share at least one characteristic) and, instead, require merchants to post questions that are accessible to any (unreliable or dissimilar) person or entity using the website. Techniques described herein provide a social network for merchants to enable merchants at least to exchange information with confidence of its relevance and/or credibility.

Techniques described herein are directed to the formation and utilization of merchant groups. In one example, merchant groups enable merchants to exchange information with other similar merchants. For the purpose of this discussion, a merchant group can refer to two or more merchants with a determined similarity that meets or exceeds a threshold. In at least one example, two merchants having at least one shared characteristic can have a determined similarity that meets or exceeds a threshold. The merchant groups enable merchants to receive relevant and credible information from other merchants in a same merchant group, and access additional social networking services as described herein. For instance, merchants in a merchant group can use a website, application, or other technology to communicate with each other by posting or sharing information, comments, messages, images, resources, etc. As a non-limiting example, a merchant with a question can post the question to a message board that restricts access to merchants in a particular merchant group (who are therefore similar to the merchant in at least one way). As a result, the merchant can be confident that responses received via the message board are relevant and/or credible.

The merchant social network described herein can facilitate the provisioning of accurate, credible, and/or relevant information to merchants. Furthermore, the merchant social network described herein can facilitate merchant trust in the information received via an assigned merchant group. That is, merchants in a merchant group can have confidence that information received via the merchant group is relevant and/or credible. For instance, in a non-limiting example, a florist associated with a particular merchant group who is seeking information regarding suppliers can request and/or receive information from other florists. By seeking information from florists in a specific florist merchant group, this merchant can have confidence that the information is relevant and/or credible. As another example, a non-profit corporation can seek and receive information regarding payroll from other non-profit corporations that are members of a non-profit corporations merchant group. The merchant seeking information can rely on the fact that the group consists of non-profit corporations in determining the relevancy and/or credibility of the information.

Each merchant serviced by the payment processing service can be associated with a plurality of characteristics. Characteristics of merchants can include, but are not limited to, characteristics specific to a merchant itself, for example, a type of merchant, a merchant category code ("MCC"), a location(s) of a merchant, hours of operation of a merchant, non-profit or for-profit status of a merchant, mobility of a merchant store (e.g., whether the merchant operates from a food truck or a building), inventory of a merchant, square footage of a brick-and-mortar store of a merchant, items offered for sale by a merchant, etc. Furthermore, characteristics of merchants can also include, but are not limited to, characteristics associated with merchant transactions, which can include, for example, a volume of transactions processed by a merchant (or on behalf of the merchant), a frequency of transactions processed by a merchant (or on behalf of the merchant), an average transaction amount for transactions processed by a merchant (or on behalf of the merchant), a transaction amount for transactions occurring during a period of time that are processed by a merchant (or on behalf of the merchant), an average transaction amount for transactions occurring during a period of time that are processed by a merchant (or on behalf of the merchant), most popular time(s) of day for transactions processed by a merchant (or on behalf of the merchant), a payment history associated with a merchant, etc. Moreover, characteristics of merchants may also include, but are not limited to, characteristics associated with various entities associated with a merchant, which can include, for example, suppliers used by a merchant, customers of a merchant, merchants related to a merchant (e.g., through common ownership), a number or identity of employees of a merchant, etc. In at least one example, characteristics of merchants can also include, but are not limited to, characteristics associated with a relationship between a merchant and payment processing service, which can include, for example, a type of point-of-sale ("POS") device used by a merchant, payment processing service services used by a merchant (e.g., invoice services, appointment services, POS services, e-commerce services), support requests, etc.

Techniques described herein can associate merchants having one or more shared characteristics with a same merchant group. That is, in at least one example, merchants having a similarity above a threshold can be associated with a same merchant group. For example, a merchant group can include merchants with a shared location and/or a shared MCC. In some examples, a merchant can be associated with more than one merchant group. As a non-limiting example, a florist who is located in a 21271 ZIP code could be a member of the "Location 21271" merchant group in addition to being a member of the "Florist" merchant group. Techniques described herein can associate merchants with merchant groups upon initial registration with the payment processing service, or at any time during which merchants utilize services of the payment processing service. For instance, upon initial registration with the payment processing service, the payment processing service can associate a merchant with one or more merchant groups that are associated with one or more characteristics of the merchant. In some examples, the payment processing service can make such an association based on an election by the merchant, or, in other examples, without an election by the merchant (e.g., automatically).

In at least one example, the number and/or size of merchant groups can be determined at least in part by the number of merchants and/or the number of characteristics associated with merchants. Furthermore, merchant groups and merchant group membership can be dynamic, such that the number of merchant groups and/or the membership of such merchant groups changes depending on changing numbers of merchants and/or changing characteristics of the merchants. As the number of merchants increases, so, too, does the personalization of the merchant social network for each merchant. For instance, as more merchants join the merchant social network described herein, additional and/or alternative merchant groups can be formed, which can increase the specificity of how merchants are grouped. That is, as more merchants join the merchant social network, the similarity between merchants within a merchant group can increase, thereby enhancing the relevance and personalization of interactions between merchants in a same merchant group.

Techniques described herein can provide a number of benefits and improvements for both merchants and the payment processing service. As described above, techniques described herein enable merchants to access relevant and/or credible information. That is, by grouping merchants based on similarity and enabling grouped merchants to exchange information, techniques described herein enable merchants to have more trust in the information they are receiving.

Furthermore, an additional technical benefit provided by the techniques described herein is a reduced burden on the payment processing service support team. For example, when associated with a merchant group as described herein, a merchant can find a solution to a problem, concern, issue, etc. by searching within resources of the merchant group rather than by requesting assistance from the support team. Furthermore, the system utilizes machine learning models to group similarly-situated merchants together and can automatically provision communication channels between merchants and associated devices within a merchant group in order to respond to identified problems or inquiries. Moreover, when an inquiry is directed to the support team, the support team itself can use the merchant social network to more quickly and accurately identify solutions. For example, the support team can focus a search on records of past problems of merchants who are similar to the merchant seeking support (that is, who are in a same merchant group). For instance, as a non-limiting example, if a merchant is experiencing difficulty with a POS device, the support team can (1) determine that the merchant seeking assistance is a baker, (2) search support tickets of a "Baker" merchant group, and (3) determine that a particular oven used in bakeries has been found to cause interference with POS devices when the POS devices were within 10 feet of the oven. The merchant social network system or the support team can therefore more quickly troubleshoot the merchant's problem by use of the merchant groups.

Additionally, techniques described herein can provide various computational benefits, which can increase the efficiency with which merchants are able to exchange information. For instance, a merchant social network, as described herein, reduces the burden on server(s) associated with the payment processing service: For example, techniques described herein enable reductions to storage, processing, and other resources that are required at server(s). The reduced burden on the server(s) stems, at least in part, from the fact that merchants can more effectively find solutions within the merchants' respective merchant groups than by using payment processing service resources that do not partition merchant communications by merchant characteristic(s). The resulting increased efficiency in identifying solutions facilitated by merchant groups obviates or lessens the number of searches, posts, comments, messages, etc. by merchants to the payment processing service. As such, techniques described herein both increase merchant confidence in information received and reduce computational burdens on server(s) facilitating such information exchange.

FIG. 1 illustrates an example environment 100 for forming and using merchant groups according to some implementations. Environment 100 includes two merchants who use services of payment processing service 102: merchant A 104A and merchant B 104B (collectively, merchants 104). Two merchants 104 are shown for ease of illustration; however, environment 100 can include any number of merchants. Each merchant A 104A, 104B can operate a merchant device. For instance, merchant A 104A can operate merchant device 106A, and merchant B 104B can operate merchant device 106B (collectively, merchant devices 106). Each merchant device 106A, 106B can be associated with a user interface (UI) for accessing the merchant social network. For instance, merchant device 106A can include UI 108A for social network access and merchant device 106B can include UI 108B for social network access (collectively, UIs 108).

In some examples, UI 108A for social network access can be presented via a web browser, or the like, that enables merchant A 104A to access and manage services of the merchant social network. In other examples, UI 108A for social network access can be presented via an application, such as a mobile application or desktop application, which can be provided by payment processing service 102, or which can be an otherwise dedicated application. Similarly, UI 108B for social network access can be presented via a web browser, an application, etc.

In at least one example, payment processing service 102 can provide various services, such as, but not limited to payment processing services, payroll services, inventory management services, employee management services, financing services, and appointment services. One or more computing devices can perform one or more actions on behalf of payment processing service 102, as described below with reference to FIG. 2. In at least one example, payment processing service 102 can receive merchant information 110 from one or more information sources and/or systems 112. In additional and/or alternative examples, payment processing service 102 can determine merchant information 110 based at least partly on merchant information 110 received from one or more information sources and/or systems 112. In at least one example, merchant A 104A can be associated with merchant A information 110A and merchant B 104B can be associated with merchant B information 110B.

For the purpose of this discussion, merchant information 110 can include information associated with a merchant. For the purpose of this discussion, one or more characteristics, as described above and below, can be determined based on merchant information 110. That is, merchant information 110 associated with a merchant can include a plurality of characteristics associated with the merchant and/or can be used to determine merchant characteristic information.

For instance, merchant information 110 can correspond to merchant characteristics that can include, but are not limited to characteristics specific to a merchant itself, for example, a type of merchant, a merchant category code ("MCC"), a location(s) of a merchant, hours of operation of a merchant, non-profit or for-profit status of a merchant, mobility of a merchant store (e.g., whether the merchant operates from a food truck or a building), inventory of a merchant, square footage of a brick-and-mortar store of a merchant, items offered for sale by a merchant, etc. Furthermore, characteristics of merchants can also include, but are not limited to, characteristics associated with merchant transactions, which can include, for example, a volume of transactions processed by a merchant (or on behalf of the merchant), a frequency of transactions processed by a merchant (or on behalf of the merchant), an average transaction amount for transactions processed by a merchant (or on behalf of the merchant), a transaction amount for transactions occurring during a period of time that are processed by a merchant (or on behalf of the merchant), an average transaction amount for transactions occurring during a period of time that are processed by a merchant (or on behalf of the merchant), most popular time(s) of day for transactions processed by a merchant (or on behalf of the merchant), a payment history associated with a merchant, etc. Moreover, characteristics of merchants can also include, but are not limited to, characteristics associated with various entities associated with a merchant, which can include, for example, suppliers used by a merchant, customers of a merchant, merchants related to a merchant (e.g., through common ownership), a number or identity of employees of a merchant, etc. In at least one example, characteristics of merchants can also include, but are not limited to, characteristics associated with a relationship between a merchant and payment processing service, which can include, for example, a type of POS device used by a merchant, payment processing service services used by a merchant (e.g., invoice services, appointment services, POS services, e-commerce services), support requests, etc. Additional and/or alternative merchant information 110 can be imagined.

As described above, merchant information 110 can be received by and/or determined by payment processing service 102. In at least one example, payment processing service 102 can receive merchant information 110 from one or more information sources and/or systems 112. Information sources and/or systems 112 can include merchant device(s) (e.g., merchant device 106A, merchant device 106B, etc.), social media platforms (e.g., FACEBOOK®, LINKEDIN®, etc.), review platforms (e.g., YELP®, etc.), calls and/or messages received in association with support requests, etc.

Payment processing service 102 can train and store data model(s) 114. In at least one example, payment processing service 102 can utilize machine learning algorithms to build, modify, or otherwise utilize data model(s) 114. In at least one example, the algorithms can include memory-based collaborative filtering algorithms, model-based collaborative filtering algorithms, feature-based similarity algorithms, other similarity-based algorithms, etc. Data model(s) 114 can be created from example inputs. Data model(s) 114 can analyze data to make predictions or decisions. For instance, in at least one example, payment processing service 102 can train data model(s) 114 to make recommendations with respect to merchant group membership and which merchant of the merchant group may be best suited, or recommended, to communicate a response to an inquiry from another merchant within the merchant group, based at least in part on merchant information 110. In such an example, data model(s) 114 can be trained to output a similarity score representative of a similarity between two or more merchants using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Additional details associated with training data model(s) 114 are described below with reference to FIGS. 2-4. The similarity score can be used to inform group memberships.

In at least one example, payment processing service 102 can analyze merchant information 110 utilizing metric(s) and/or data model(s) 114 to determine how to group merchants. In at least one example, payment processing service 102 can analyze merchant information 110 utilizing metric(s) and/or data model(s) 114 to determine which merchants are similar such that they can be grouped in a same merchant group. For instance, based at least in part on determining that a first characteristic is shared by merchant A 104A and merchant B 104B (e.g., both merchants are associated with a same characteristic), payment processing service 102 can associate merchant A 104A and merchant B 104B with merchant group 116A formed on the basis of the shared characteristic. In this way, payment processing service 102 can manage and route communications to different merchants 104 within a particular merchant group 116 using different communication channels and/or different communication types. For example, a communication from a merchant (e.g., merchant A 104A) in a merchant group (e.g., merchant group 116A) can be routed to another merchant in merchant group 116A by (1) a direct message 118 to another member of merchant group 116A, (2) a post to a message board or other internet forum associated with merchant group 116A, (3) participation in in a group chat with other members of merchant group 116A, etc. In one example, payment processing service 102 can provision the merchant social network to enable communications between merchants associated with the merchant group (e.g., merchant A 104A and merchant B 104B). In one instance, communication is enabled by means of a direct communication channel between the merchants 104A, 104B. As used herein, a "direct communication channel" refers a communication sent by a merchant (e.g., via a device operated by the merchant) to another merchant (e.g., to a device operated by the other merchant) via the payment processing service.

Moreover, payment processing service 102 can select a particular communication channel and/or communication type to use for a communication based on at least one of an analysis of the urgency of the inquiry (e.g., POS device malfunction has previously lead to decreased sales with other merchants within the merchant group) or the preferred communication type (e.g., direct message, post, group chat, etc.) utilized by a merchant during a particular time as determined by payment processing service 102.

Merchant group 116B can include one or more merchants 104 that share one or more other characteristics, merchant group 116N can include one or more merchants 104 that share one or more other characteristics, and so on. In some examples, merchants 104 can be grouped based at least in part on a similarity score output by the data model(s) 114. As described above, in some examples, merchant A 104A and/or merchant B 104B can be associated with more than one merchant group. Additionally, one or more additional merchants can also be associated with merchant group 116A.

In at least one example, upon determining that a merchant, for example merchant A 104A, is associated with a merchant group, for example merchant group 116A, payment processing service 102 notifies merchant A 104A that the merchant qualifies for membership in merchant group 116A and informs merchant A 104A that the merchant can be associated with merchant group 116A upon election to join merchant group 116A. In such an example, a notification can be sent from payment processing service 102 to merchant A 104A by direct message that is presented on merchant device 106A of merchant A 104A. Merchant A 104A can make an election via UI 108A on merchant device 106A. In an additional and/or alternative example, a direct message can be surfaced by payment processing service 102 to merchant A 104A through a webpage associated with payment processing service 102, and merchant A 104A can make an election by selecting an option on the webpage. In at least one example, payment processing service 102 can associate merchant A 104A with merchant group 116A upon receiving an indication of the election by merchant A 104A.

In another example, payment processing service 102 associates merchant A 104A with merchant group 116A without an affirmative election by merchant A 104A (e.g., automatically). In at least one example, upon associating merchant A 104A with merchant group 116A, payment processing service 102 can send a notification to merchant A 104A by direct message that can be presented on merchant device 106A of merchant A 104A and/or that can be surfaced through a webpage associated with payment processing service 102.

When merchants 104 (e.g., merchant A 104A, merchant B 104B) are associated with (or are "members of") a merchant group (e.g., merchant group 116A), merchants 104 can use one or more social networking services to interact and/or exchange information. For example, merchants 104 can communicate with each other in different ways, using different communication types. For instance, a merchant (e.g., merchant A 104A) in a merchant group (e.g., merchant group 116A) can (1) send a direct message 118 to another member of the merchant group (e.g., "Where do you buy your coffee beans?"), (2) post to a message board or other internet forum associated with the merchant group, (3) engage in a group chat with other members of the merchant group, (4) browse or search the merchant group message board content, etc. The content of the various communications can be recommendations, announcements, questions, advertisements, etc.

For instance, merchants 104 can communicate with each other by using direct messaging (e.g., text message, email, chat, etc.), wherein a direct message is a communication that can be transmitted to designated members of merchant group 116A instead of to merchant group 116A as a whole. In at least one example, merchants 104 within merchant group 116A can directly message one another. As an example, merchant B 104B can use merchant device 106B to send direct message 118 to merchant device 106A of merchant A 104A based at least in part on their joint membership in merchant group 116A. In an example, direct message 118 can be received by payment processing service 102 (e.g., from merchant device 106B), and payment processing service 102 can cause direct message 118 to be presented on merchant device 106A of the recipient(s). In an additional and/or alternative example, direct message 118 can be surfaced to merchant A 104A through a website associated with payment processing service 102. In another example, merchants 104 can send and/or receive direct messages to/from the payment processing service 102.

In at least one example, merchants 104 in a merchant group (e.g., merchant group 116A) can post to a message board, or other internet forum, wherein a post can be accessed and/or viewed by any/all members of the merchant group. The posts can be questions, general announcements (e.g., announcements about events), recommendations, advertisements, etc. For instance, merchant A 104A can post to a message board of merchant group 116A about a technical issue that merchant A 104A is experiencing in order to seek the assistance of other merchants in merchant group 116A that may have experienced a similar issue, and that may have suggestions for resolution.

Additionally, merchants 104 can use a group chat capability provided by payment processing service 102 as part of the merchant social network. A group chat provides for real-time communications to be transmitted to one or more members of a merchant group (e.g., merchant group 116A) and enables display of communications either on a merchant device (e.g., merchant device 106A, 106B) or on a webpage associated with payment processing service 102.

Additionally, merchants 104 can browse or search one or more message boards associated with a merchant group (e.g., merchant group 116A) to which they belong to look for posts about a topic. Merchants 104 are given access to the message board by payment processing service 102 by virtue of membership in merchant group 116A. For example, a merchant that recently opened a business can browse information in and related to the merchant group to learn about one or more aspects of the business, refined by particular characteristic(s) the members of merchant group A 116A share. Payment processing service 102 can additionally or alternatively sort the posts on a message board of merchant group 116 such that certain posts appear at the top of the page.

Payment processing service 102 can set parameters and settings for the communications each merchant group 116 can use. For example, payment processing service 102 can set a parameter for merchant group 116A that enables all merchants in merchant group 116A to use a message board function but does not allow the merchants to use a direct message function. In another example, payment processing service 102 can set a parameter for an individual merchant A 104A in merchant group 116A that allows individual merchant A 104A to view a message board but prohibits merchant A 104A from posting to the message board.

Merchants 104 in merchant group 116 can receive notifications related to the communications of members of merchant group 116. For example, payment processing service 102 can send a merchant, such as merchant A 104A, a notification that is presented via a display of a corresponding merchant device, such as merchant device 106A. The notification can be in the form of a text message, an email, a push notification, a sound, a notification associated with a dashboard, a notification associated with the message board, etc. For example, payment processing service 102 can transmit to a merchant device 106A a time-sensitive notification affecting merchants 104 in merchant group 116A, such as a technical problem with a certain model of POS device used by at least some merchants 104 in merchant group 116A. In an example, a notification can be presented using UI 108A via a web browser or an application, such as a mobile application or desktop application, which can be provided by payment processing service 102, or which can be an otherwise dedicated application.

Payment processing service 102 can offer incentives to merchants 104 for participating in merchant group 116. For example, payment processing service 102 can send a direct message to merchant A 104A that offers a reward to merchant A 104A for posting answer(s) to question(s) that other merchant(s) have posted in merchant group 116A. For instance, an incentive can include free (or discounted) processing for merchant A 104A from payment processing service 102 or free (or discounted) advertising space on a page associated with payment processing service 102.

As illustrated in FIG. 1, techniques described herein are directed to merchant social networks that use merchant groups to connect merchants with like characteristics. As described above, techniques illustrated in FIG. 1 can increase the quality and efficiency of communications between merchants—and between merchants and the payment processing service—by means of merchant groups. Accordingly, linking similar merchants 104 can provide improvements such as reducing merchant contact with the support team of payment processing service 102 and increasing merchant-to-merchant communications. As described above, merchants can have a higher degree of trust in the relevance and/or credibility of information received from or in a merchant group, at least because the merchants know that the source of the information is merchants that the payment processing service has determined are similar to them.

Figure 2:
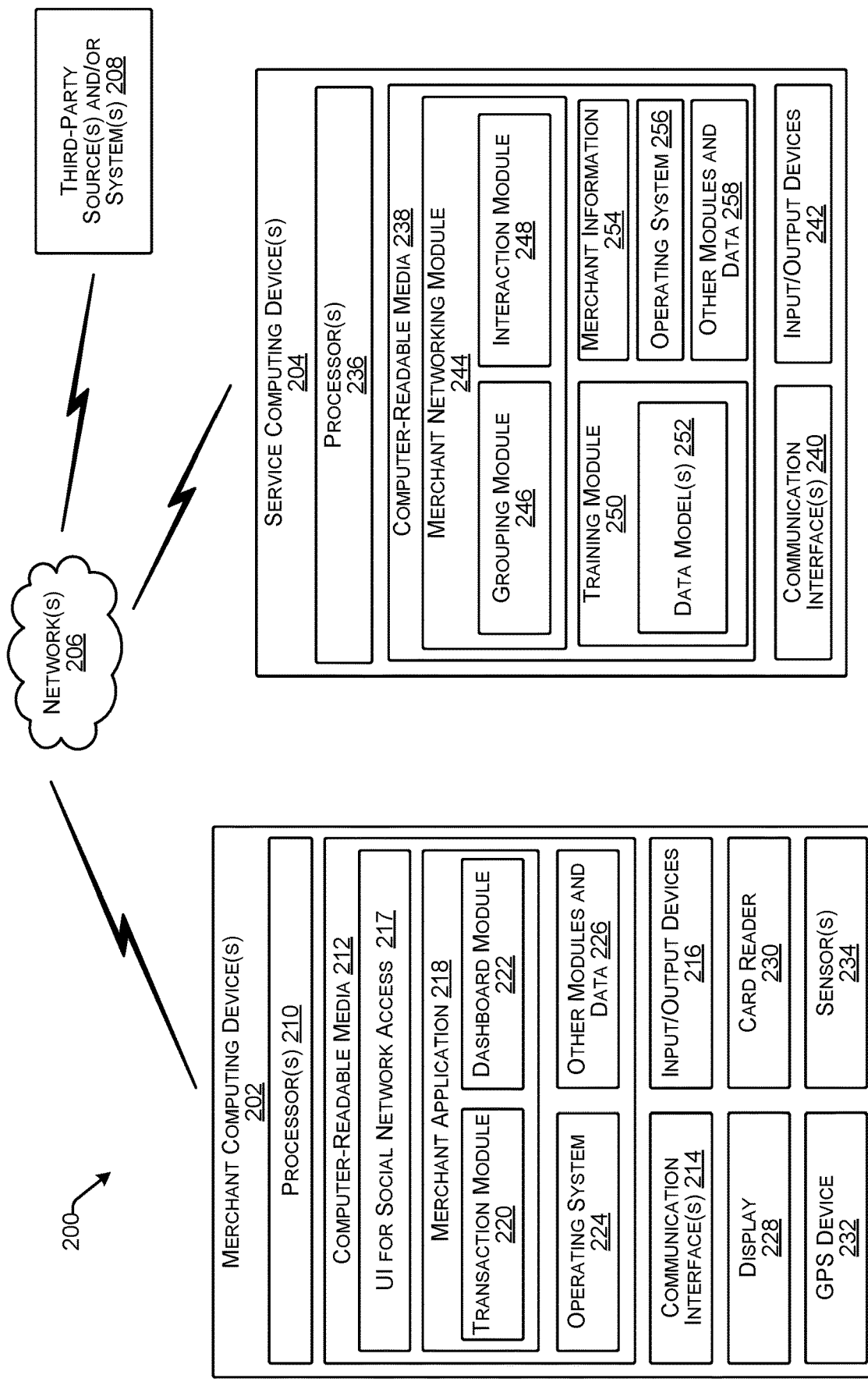
FIG. 2 illustrates an example environment for a social network for merchants according to some implementations.

FIG. 2 illustrates an example environment 200 for a social network for merchants, according to some implementations. Environment 200 can include one or more merchant computing devices 202, which can communicate with one or more service computing device(s) 204 via one or more networks 206. In at least one example, merchant computing device(s) 202 and/or service computing device(s) 204 can also communicate with third-party source(s) and/or system(s) 208 via network(s) 206.

A merchant (not shown in FIG. 2) can operate merchant computing device(s) 202. In at least one example, merchant computing device(s) 202 can be any suitable type of computing device, e.g., portable, semi-portable, semi-stationary, or stationary. Some examples of merchant computing device(s) 202 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. Merchant devices 104 as described above with reference to FIG. 1 can correspond to merchant computing device(s) 202.

In the illustrated example, merchant computing device(s) 202 can include one or more processors 210, one or more computer-readable media 212, one or more communication interfaces 214, and one or more input/output (I/O) devices 242. Each processor 210 can itself include one or more processors or processing cores. For example, processor(s) 210 can be implemented as one or more microprocessors, microcomputers, microcontrollers, digital signal processors, central processing units, state machines, logic circuitries, and/or any devices that manipulate signals based on operational instructions. In some examples, processor(s) 210 can be one or more hardware processors and/or logic circuits of any suitable type specifically programmed or configured to execute the algorithms and processes described herein. Processor(s) 210 can be configured to fetch and execute computer-readable processor-executable instructions stored in computer-readable media 212.

Depending on the configuration of merchant computing device(s) 202, computer-readable media 212 can be an example of tangible non-transitory computer storage media and can include volatile and nonvolatile memory and/or removable and non-removable media implemented in any type of technology for storage of information such as computer-readable processor-executable instructions, data structures, program modules or other data. Computer-readable media 212 can include, but is not limited to, RAM, ROM, EEPROM, flash memory, solid-state storage, magnetic disk storage, optical storage, and/or other computer-readable media technology. Further, in some examples, merchant computing device(s) 202 can access external storage, such as RAID storage systems, storage arrays, network attached storage, storage area networks, cloud storage, or any other medium that can be used to store information and that can be accessed by processor(s) 210 directly or through another computing device or network. Accordingly, computer-readable media 212 can be computer storage media able to store instructions, modules, or components that can be executed by processor(s) 210. Further, when mentioned, non-transitory computer-readable media exclude media such as energy, carrier signals, electromagnetic waves, and signals per se.

Computer-readable media 212 can be used to store and maintain any number of functional components that are executable by processor(s) 210. In some implementations, these functional components comprise instructions or programs that are executable by processor(s) 210 and that, when executed, implement operational logic for performing the actions and services attributed above to merchant computing device(s) 202. Functional components stored in computer-readable media 212 can include a user interface (UI) for social network access (UI 217) to allow the merchant to access the merchant group(s) and merchant application 218, which can include transaction module 220 and dashboard module 222.

Merchant computing device(s) 202 can include an instance of UI 217 to allow the merchant to access and use the merchant group(s). UI 217 can correspond to UI 108A and/or UI 108B described above with reference to FIG. 1. In at least one example, UI 217 can be presented via a web browser, or the like, that enables access to the merchant social network. In other examples, UI 217 can be presented via an application, such as a mobile application or desktop application, which can be provided by the payment processing service, or which can be an otherwise dedicated application. In at least one example, UI 217 can receive instructions associated with a user interface from the payment processing service. UI 217 can utilize the instructions for presenting UI 217 to facilitate (1) joining (or dropping out of) a merchant group and/or (2) interacting with the merchant social network.

For instance, in at least one example UI 217 can receive a notification that the merchant is qualified to join a merchant group. In such an example, UI 217 can present the notification to the merchant (e.g., via a display of the merchant computing device(s) 202). The notification can include a control that enables the merchant to interact with UI 217 to elect to join the merchant group. For instance, the merchant can actuate the control such to indicate his/her desire to join the merchant group, and UI 217 can send an indication of the merchant's desire to service computing device(s) 204. Additionally and/or alternatively, UI 217 can receive a notification that the merchant has been added to a merchant group (e.g., automatically). Moreover, in at least one example, UI 217 can enable the merchant to remove itself from a merchant group (e.g., by interacting with a control or other mechanism to indicate its desire to be removed from a merchant group).

In another example, UI 217 can receive and present a notification associated with interactions between merchants of the merchant group. For instance, UI 217 can receive and present a notification to the merchant (e.g., via a display of the merchant computing device(s) 202) that another merchant has posted a message on a message board associated with a merchant group.

In an additional and/or alternative example, UI 217 can include control(s) to enable a merchant to receive or transmit direct messages to/from members of a merchant group or to/from the payment processing service (e.g., via email, text message, chat, etc.). For instance, UI 217 can present a control in association with an email template to enable a merchant to draft an email to be sent to one or more members of a particular merchant group. Actuation of such a control can cause the email to be sent to the one or more members via service computing device(s) 204.

In an additional and/or alternative example, UI 217 can include control(s) to allow a merchant to post a message to one or more message boards. For instance, UI 217 can present a control in association with an input mechanism to enable a merchant to post a post to a message board associated with a merchant group via service computing device(s) 204.

In an additional and/or alternative example, UI 217 can include control(s) to allow a merchant to browse and/or search posts on one or more message boards. For instance, UI 217 can present a control associated with a search functionality to enable a merchant to search information posted on a message board related to one or more aspects of the business of the merchant.

In an additional and/or alternative example, UI 217 can include control(s) to allow a merchant to engage in a group chat with other members of the merchant group by sending messages (e.g., UI 217 can present a control in association with a message template to enable a merchant to draft a message to be included in the group chat forum via the service computing device(s) 204). UI 217 can also include control(s) to allow a merchant to view and/or search messages of the other merchants in the group chat (e.g., via a display of the merchant computing device(s) 202) from the group chat.

In at least one example, merchant computing device(s) 202 can include an instance of merchant application 218 that can be executed on merchant computing device(s) 202. Merchant application 218 can provide point-of-sale (POS) functionality to merchant computing device(s) 202 to enable the merchant to accept payments from one or more customers at a POS location. For example, the merchant can use merchant computing device(s) 202 to accept payments through various different types of payment instruments, e.g., payment cards, electronic payment, cash or check, at the POS location from the one or more customers. In at least one example, transaction module 220 can present various user interfaces to enable a merchant to conduct transactions, receive payments, and so forth. Further, the dashboard module 222 can enable the merchant to manage transactions, payments, and so forth, via a dashboard. For the purpose of this discussion, a dashboard can be a user interface that provides an at-a-glance view of key information (e.g., associated with transactions, payments, etc.). In at least one example, UI 217 can be presented in association with a dashboard presented via the dashboard module 222.

Furthermore, computer-readable media 212 can include additional functional components, such as operating system 224 for controlling and managing various functions of merchant computing device(s) 202 and for enabling basic user interactions. In addition, computer-readable media 212 can also store data, data structures and the like, that are used by the functional components. Depending on the type of merchant computing device(s) 202, computer-readable media 212 can also optionally include other functional components and data, such as other modules and data 226, which can include programs, drivers, etc., and the data used or generated by the functional components. For instance, in some examples, merchant computing device(s) 202 can include a payroll module, an inventory management module, an employee management module, a financing module, an appointment module, etc., which can facilitate payroll services, inventory management services, employee management services, financing services, appointment services, etc., respectively. Further, merchant computing device(s) 202 can include many other logical, programmatic and physical components, of which those described are merely examples that are related to the discussion herein.

Communication interface(s) 214 can include one or more interfaces and hardware components for enabling communication with various other devices, such as over network(s) 206 or directly. For example, communication interface(s) 214 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Merchant computing device(s) 202 can further include one or more I/O devices 216. I/O devices 216 can include speakers, a microphone, a camera, and various user controls (e.g., buttons, a joystick, a keyboard, a keypad, etc.), a haptic output device, and so forth.

In at least one example, merchant computing device(s) 202 can include display 228. Depending on the type of computing device(s) used as merchant computing device(s) 202, display 228 can employ any suitable display technology. For example, display 228 can be a liquid crystal display, a plasma display, a light emitting diode display, an OLED (organic light-emitting diode) display, an electronic paper display, or any other suitable type of display able to present digital content thereon. In some examples, display 228 can have a touch sensor associated with display 228 to provide a touchscreen display configured to receive touch inputs for enabling interaction with a graphic interface presented on display 228. Accordingly, implementations herein are not limited to any particular display technology. Alternatively, in some examples, merchant computing device(s) 202 may not include display 228, and information can be presented by other means, such as aurally.

In addition, merchant computing device(s) 202 can include or can be connectable to card reader 230. In some examples, card reader 230 can plug in to a port in merchant computing device(s) 202, such as a microphone/headphone port, a data port, or other suitable port. Card reader 230 can include a read head for reading a magnetic strip of a payment card, and further can include encryption technology for encrypting the information read from the magnetic strip. Alternatively, numerous other types of card readers can be employed with merchant computing device(s) 202 herein, depending on the type and configuration of merchant computing device(s) 202.

Other components included in merchant computing device(s) 202 can include GPS device 232 that is able to indicate location information. Further, merchant computing device(s) 202 can include one or more sensors 234, such as an accelerometer, gyroscope, compass, proximity sensor, camera, microphone, and/or a switch, as discussed above. Additionally, merchant computing device(s) 202 can include various other components that are not shown, examples of which include removable storage, a power source, such as a battery and power control unit, a barcode scanner, a printer, a cash drawer, and so forth.

As described above, techniques described herein are directed to using merchant groups to enable social networking of merchants that are associated with a payment processing service. In at least one example, the payment processing service can operate service computing device(s) 204. Service computing device(s) 204 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of service computing device(s) 204 as being present in a single location, these components and data can alternatively be distributed across different computing devices and different locations in any manner. Consequently, the functions can be implemented by one or more service computing devices, with the various functionality described above distributed in various ways across the different computing devices. Multiple service computing device(s) 204 can be located together or separately, and organized, for example, as virtual servers, server banks, and/or server farms. The described functionality can be provided by the servers of a single entity or enterprise, or can be provided by the servers and/or services of multiple different customers or enterprises.

In the illustrated example, service computing device(s) 204 can include one or more processors 236, one or more computer-readable media 238, one or more communication interfaces 240, and one or more input/output devices 242. Each of the one or more processors 236 can be a single processing unit or a number of processing units, and can include single or multiple computing units or multiple processing cores. The one or more processors 236 can be implemented as one or more microprocessors, microcomputers, microcontrollers, digital signal processors, central processing units, state machines, logic circuitries, and/or any devices that manipulate signals based on operational instructions. For example, one or more processors 236 can be one or more hardware processors and/or logic circuits of any suitable type specifically programmed or configured to execute the algorithms and processes described herein. One or more processors 236 can be configured to fetch and execute computer-readable instructions stored in computer-readable media 238, which can program one or more processors 236 to perform the functions described herein.

Computer-readable media 238 can include volatile and nonvolatile memory and/or removable and non-removable media implemented in any type of technology for storage of information, such as computer-readable instructions, data structures, program modules, or other data. Such computer-readable media 238 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of service computing device(s) 204, computer-readable media 238 can be a type of computer-readable storage media and/or can be a tangible non-transitory media to the extent that when mentioned, non-transitory computer-readable media exclude media such as energy, carrier signals, electromagnetic waves, and signals per se. Computer-readable media 238 can be used to store any number of functional components that are executable by one or more processors 236. In many implementations, these functional components comprise instructions or programs that are executable by one or more processors 236 and that, when executed, specifically configure one or more processors 236 to perform the actions attributed above to payment processing service 102. Functional components stored in computer-readable media 238 can include merchant networking module 244, which can include grouping module 246 and interaction module 248, and training module 250, which can store one or more data model(s) 252.

Service computing device(s) 204 can include an instance of merchant networking module 244. Merchant networking module 244 can be configured to facilitate forming and/or updating of merchant groups and/or to facilitate interactions between merchants of the merchant groups. In at least one example, merchant networking module 244 can include an instance of grouping module 246 and an instance of interaction module 248.

In at least one example, grouping module 246 can be configured to analyze merchant information 254 to intelligently determine grouping(s) of merchants. Merchant information 254 can be stored in a database in computer-readable media 238, as described below. As described above, merchant information 254 can include information associated with a merchant. Merchant information 254 can include one or more merchant characteristics. For instance, merchant information 254 can correspond to merchant characteristics that can include, but are not limited to characteristics specific to a merchant itself, for example, a type of merchant, a merchant category code ("MCC"), a location(s) of a merchant, hours of operation of a merchant, non-profit or for-profit status of a merchant, mobility of a merchant store (e.g., whether the merchant operates from a food truck or a building), inventory of a merchant, square footage of a brick-and-mortar store of a merchant, items offered for sale by a merchant, etc. Such merchant information 254 can be received by the service computing device(s) 204 from a device operated by a merchant (e.g., merchant computing device(s) 202), for instance when the merchant sets up an account with the payment processing service or at a subsequent time. Additionally and/or alternatively, merchant information 254 associated with such merchant characteristics can be determined based on information received from one or more third-party source(s) and/or system(s) 208. Additionally, merchant information 254 can be analyzed to determine merchant characteristic information associated with merchants, and from the merchant characteristic information, a shared characteristic of the merchants can be determined.

As described above, in some examples, merchant computing device(s) 202 can execute an instance of merchant application 218 that is installed to configure the merchant computing device(s) 202 as a POS terminal. In such examples, merchant application 218 (e.g., via the transaction module 220) can communicate transaction data to service computing device(s) 204. In at least one example, merchant information 254 can include transaction data received from merchant application 218. In at least one example, merchant information 254 can include characteristics associated with the transaction data. For instance, characteristics of merchants can also include, but are not limited to, characteristics associated with merchant transactions, which can include, for example, a volume of transactions processed by a merchant (or on behalf of the merchant), a frequency of transactions processed by a merchant (or on behalf of the merchant), an average transaction amount for transactions processed by a merchant (or on behalf of the merchant), a transaction amount for transactions occurring during a period of time that are processed by a merchant (or on behalf of the merchant), an average transaction amount for transactions occurring during a period of time that are processed by a merchant (or on behalf of the merchant), most popular time(s) of day for transactions processed by a merchant (or on behalf of the merchant), a payment history associated with a merchant, etc.

Moreover, characteristics of merchants can also include, but are not limited to, characteristics associated with various entities associated with a merchant, which can include, for example, suppliers used by a merchant, customers of a merchant, merchants related to a merchant (e.g., through common ownership), a number or identity of employees of a merchant, etc. Merchant information 254 associated with such characteristics can be determined based on various merchant interactions with the payment processing system (e.g., inventory services, employee management services, etc.). In at least one example, characteristics of merchants can also include, but are not limited to, characteristics associated with a relationship between a merchant and payment processing service, which can include, for example, a type of POS device used by a merchant, payment processing service services used by a merchant (e.g., invoice services, appointment services, POS services, e-commerce services), support requests, etc. Merchant information 254 associated with such characteristics can be determined based on additional and/or alternative merchant interactions with the payment processing system. Additional and/or alternative merchant information 254 can be imagined.

In at least one example, grouping module 246 can be configured to intelligently determine, by utilization of one or more data models 252 trained by training module 250, a similarity score reflecting a similarity between a merchant and another merchant, or between a merchant and a group of merchants. For instance, grouping module 246 can utilize data model(s) 252 to calculate a similarity score indicative of similarity between the merchant and the other merchant (or the merchant group) based on one or more merchant characteristics (e.g., MCC, location, inventory, etc.). That is, a similarity score is associated with a degree of similarity between a merchant and at least one other merchant (or merchant group).

In at least one example, the similarity score can be indicative of an extent to which merchants share characteristics. For instance, a similarity score that meets or exceeds a threshold can indicate that two or more merchants share at least one characteristic. In such an example, a higher similarity score (e.g., close to one on a scale from zero to one) can indicate that the two or more merchants share multiple characteristics. Alternatively, a lower similarity score (e.g., close to zero on a scale from zero to one) can indicate that the two or more merchants do not share any characteristics. Of course, other scales can be used; a scale from zero to one is provided for an example. In some examples, particular characteristics can be weighted such to have different effects on a similarity score. For instance, in a non-limiting example, if merchant category code is valued more than geolocation, merchant category code can be weighted such that it increases the similarity score more so than geolocation. Additionally, or alternatively, in another non-limiting example, geolocation can be irrelevant and may not factor into the similarity analysis. In such an example, geolocation can be associated with a weight such that it does not impact the similarity score.

As described above, based at least in part on analyzing merchant information 254, data model(s) 252 can output a similarity score representative of a similarity between a merchant and at least one other merchant. Merchants with a similarity score that meets or exceeds a threshold can be associated with a same merchant group. Additionally, or alternatively, when a merchant and a merchant group have a similarity score that meets or exceeds a threshold, the merchant can be associated with the merchant group. For instance, grouping module 246 can access merchant information 254 associated with two or more merchants and can leverage data model(s) 252 to analyze merchant information 254. Accordingly, grouping module 246 can compare the similarity score with a threshold and, based at least in part on determining that the similarity score meets or exceeds a threshold, grouping module 246 can associate the merchant and the at least one other merchant with a same merchant group. If the at least one other merchant is already part of a merchant group, grouping module 246 can associate the merchant with the merchant group.

In some examples, grouping module 246 can determine similarity responsive to an occurrence of one or more prompting events. For example, grouping module 246 can determine similarity (1) upon receiving a registration from a new merchant, (2) upon receiving a membership request from a merchant (e.g., a request to participate in the merchant social network, a request to change merchant groups, etc.), (3) upon receiving a membership request from the support team, (4) upon receiving information indicating that merchant information 254 has changed, and/or (5) at a regular frequency. That is, responsive to an occurrence of a prompting event, grouping module 246 can access merchant information 254 associated with two or more merchants, and group merchant(s) based on a determined similarity between two or more merchants.

In an example, grouping module 246 can determine similarity upon receiving registration information associated with a merchant registering for service with the payment processing service. For example, merchant information 254 can be included as part of registration data that is transmitted by merchant computing device(s) 202 via network(s) 206 to service computing device(s) 204 at the time of merchant registration. Other modules 258 of service computing device(s) 204 receive the registration information and transmit it to grouping module 246 at additional and/or alternative times. Responsive to receiving merchant information 254, grouping module 246 can analyze merchant information 254 to determine whether to assign the merchant to any merchant group(s) and/or which merchant group(s) to assign the merchant.

In an additional and/or alternative example, grouping module 246 can receive a membership request from a merchant already receiving services from the payment processing service. For example, a merchant can send a membership request via a control of UI 217 to be added to a non-specified merchant group, or a particular merchant group. Merchant computing device(s) 202 can transmit the membership request via network(s) 206 to service computing device(s) 204. Grouping module 246 can receive the membership request and, responsive to receiving the membership request, can determine a similarity between the merchant and the particular merchant group or to one or more merchant groups, generally.

In response to an occurrence of a prompting event, grouping module 246 can determine similarity. In an example, grouping module 246 can access merchant information 254, which, as described above, can be stored in a database. In at least one example, the database storing merchant information 254 can be arranged in merchant profiles associated with individual merchants. The data in the database can be received from merchant computing device(s) 202, third-party source(s) and/or system(s) 208, etc., as described above. In at least one example, based at least in part on accessing merchant information 254, grouping module 246 can determine a similarity between the merchant and another merchant (or merchant group) based on one or more merchant characteristics (e.g., by using data model(s) 252). In at least one example, the similarity can be represented as a similarity score. Based upon the similarity score meeting or exceeding a threshold, grouping module 246 can associate a merchant with another merchant (or with a particular merchant group).

In at least one example, based on an association between the merchants, grouping module 246 can add merchant(s) to a particular merchant group. When merchants are associated with (or are "members of") a merchant group, merchants can use one or more social networking services to interact and/or exchange information. For example, merchants can communicate with each other in different ways, using different communication types. For instance, a merchant in a merchant group can (1) send a direct message to another member of the merchant group, (2) post to a message board or other internet forum associated with the merchant group, (3) engage in a group chat with other members of the merchant group, (4) browse or search the merchant group message board content, etc. The content of the various communications can be recommendations, announcements, questions, advertisements, etc. In one example, upon association of a merchant with a merchant group, communications between the merchant and the merchant group are enabled by service computing device(s) 204 provisioning the merchant social network associated with the merchant group to enable communication between merchants of the merchant group. In one instance, communication is enabled by means of a direct communication channel between the merchants.

In some examples, grouping module 246 can add a merchant to a merchant group with which another (similar) merchant is already associated. In other examples, grouping module 246 can add a merchant and another (similar) merchant to a new merchant group. In at least one example, the grouping module 246 can add the merchant(s) to the merchant group by adding an indicator of such merchant group to respective merchant profile(s) of the merchant(s). Additionally and/or alternatively, the grouping module 246 can add the merchant(s) to the merchant group by mapping, or otherwise associating merchant profile(s) associated with the merchant(s) to the merchant group.

In an example, adding the merchant to the merchant group can occur without receiving an election from the merchant to join. That is, in some examples, grouping module 246 can add a merchant to a merchant group automatically. Alternatively, in some examples, a merchant can elect to join a merchant group prior to the merchant being added to the merchant group. In such examples, grouping module 246 can send a device operated by the merchant (e.g., merchant computing device(s) 202) an indication of eligibility to join at least one merchant group, together with an indication of one or more steps the merchant can follow to affirmatively elect to join merchant group (e.g., via interaction with UI 217). If grouping module 246 receives an indication of an election to join the merchant group, grouping module 246 can associate the merchant with the merchant group. In either example (e.g., where the merchant is added automatically and/or the merchant is added based on an election), grouping module 246 can send a notification to a device operated by the merchant (e.g., merchant computing device(s) 202) to inform the merchant that the merchant has been made a member of the merchant group.

Merchant networking module 244 can also include interaction module 248. In at least one example, interaction module 248 can coordinate communications among merchant computing devices 202 and/or communications between merchant computing devices 202 and service computing device(s) 204, etc.

In at least one example, interaction module 248 can receive a communication from merchant computing device(s) 202 of a merchant that is a member of a merchant group. The communication can be a request by the member to post to a message board or other forum associated with the merchant group, a direct message to other merchant(s), a request to engage in a group chat with other member(s) of the merchant group, an indication of a search query the merchant would like to implement on a message board or elsewhere on the merchant social network, a request to browse the posts of a message board or other forum associated with the merchant group, etc.

In at least one example, a communication can include metadata indicating a merchant that sent the communication, intended recipient(s) of the communication (e.g., merchant group(s), individual merchant(s), etc.), a communication type, a data stamp, a time stamp, etc. In an example, interaction module 248 can analyze the metadata associated with the communication to determine the merchant who sent the communication, the intended recipient(s) (e.g., relevant merchant group(s) and/or individual merchant(s) within merchant group(s)), the communication type, etc., in order to determine where to route the communication.

For instance, interaction module 248 can determine the merchant who sent the communication based at least in part on metadata associated with the communication having an indicator of identity of the merchant (e.g., merchant identifier, merchant device address, etc.). In at least one example, interaction module 248 can determine the intended recipient(s) for the communication. The intended recipient(s) can be one or more merchant groups and/or individual merchant(s) within the one or more merchant groups. In at least one example, interaction module 248 can determine the merchant group(s) to which the communication pertains based at least in part on (1) metadata associated with the communication having an indicator of the merchant group(s) from which the merchant is sending the communication (e.g., an email template generated when the merchant was active on the message board for a particular merchant group), (2) a selection by the merchant of a control of UI 217 indicating the relevant merchant group, and/or (3) entry of the merchant group(s) by the merchant into a text field of UI 217. In some examples, interaction module 248 can determine the merchant group(s) to which the communication pertains responsive to receiving a communication (e.g., based on mappings or other associations between the merchant who sent the communication and one or more merchant group(s)). Furthermore, interaction module 248 can determine the intended recipient(s) of the communication based at least in part on the communication type (e.g., email, text, etc.) and/or fields of the communication (e.g., "to," addressee, etc.). In at least one example, interaction module 248 can determine the communication type (e.g., email, text, message board post, etc.) based at least in part on data or metadata associated with the communication having an indicator or communication type. In some examples, interaction module 248 can determine the intended recipient(s) based at least partly on the communication type.

Based at least in part on determining the intended recipient(s) and/or communication type, interaction module 248 can transmit the communication to devices operated by the appropriate recipient(s). That is, interaction module 248 can route the communication to the relevant merchant group and/or intended recipient. In at least one example, interaction module 248 can transmit a message to the merchant who sent the communication indicating the disposition of the communication (e.g., delivered, posted, forwarded, etc.). Additionally and/or alternatively, interaction module 248 can notify intended recipient(s) (e.g., other merchant, entire merchant group, etc.) of the communication.

For instance, the communication can be a post to a message board of a particular merchant group. Interaction module 248 can cause the post to be presented via the message board and can send notification(s) to members of the particular merchant group indicating that a new post has been added to the message board. Interaction module 248 can transmit a message to the merchant who sent the communication indicating that the post has been posted to the message board. In another example, the communication can be an email to another merchant of the merchant group. Interaction module 248 can transmit the email to the merchant computing device of the other merchant and/or the email can be surfaced to the other merchant through a website associated with payment processing service. Interaction module 248 can transmit a message to the merchant who sent the communication indicating that the email has been transmitted to the intended recipient(s).

In another example, the communication can be a support request sent by a merchant to the payment processing service (e.g., for technical support, etc.), where a support team is the determined intended recipient(s). In such an example, interaction module 248 can route the support request to a support team of service computing device(s) 204 (along with an indication of merchant group(s) of which the merchant is a member) so that the support team can determine a response to the support request. The response to the support request can be based at least in part on previous communications from other members of any merchant group(s) with which the merchant is associated, or based at least in part on information associated with merchant group(s) with which the merchant is associated. In an example, service computing device(s) 204 can determine a response to the support request by performing natural language processing of past communications between the support team and merchants in the merchant group (or communications between merchants of the merchant group). In an example, service computing device(s) 204 can also determine a response to the support request by text-searching electronic notes of support agents associated with the support team. Interaction module 248 can transmit a message to the merchant who sent the support request that the support request has been transmitted to the support team.

In at least one example, interaction module 248 can receive an indication of a search query that a merchant would like to implement on a message board or elsewhere on the merchant social network. Interaction module 248 can execute the query on the message board content, for instance, or on other social network content for which the merchant is authorized to access by service computing device(s) 204. Interaction module 248 can transmit search results to the merchant who made the search query.

In another example, interaction module 248 can receive instructions from another module 258 of service computing device(s) 204 to present a message, regarding a topic relevant to a merchant group, as a post on an electronic message board of the merchant group. Interaction module 248 can cause the post to be presented via the message board and can send notification(s) to members of the particular merchant group indicating that a new post has been added to the message board.

In another example, interaction module 248 can receive an indication that a member has asked a question of a merchant group. Interaction module 248 can access merchant information 254 associated with the inquiring merchant and the plurality of other merchants associated with the merchant group. Interaction module 248 can leverage data model(s) 252 to analyze merchant information 254 of the inquiring merchant and the plurality of other merchants. Data model(s) 252 can output similarity scores representative of a similarity between the inquiring merchant and each of the plurality of other merchants. Interaction module 248 can compare the similarity scores and identify (e.g., by ranking the similarity scores and identifying the top-ranked merchant) a recommended merchant recipient to answer the question. In one example, interaction module 246 can provision the merchant social network associated with the merchant group to enable communication between the inquiring merchant and the recommended merchant recipient. In one instance, interaction module 246 can provision the merchant social network to enable communication by enabling a direct communication channel between the inquiring merchant and the recommended merchant recipient and/or by facilitating access by the direct communication channel to a merchant device of the recommended merchant recipient.

Additionally, or alternatively, upon interaction module 248 receiving an indication that a member is asking a question of the member group, interaction module 248 can determine a recommended merchant recipient to answer the question by analyzing previous communications from, to, between, and/or among the plurality of merchants associated with the merchant group. Based on the question and the previous communications, interaction module 248 can identify at least one recommended merchant recipient of the plurality of merchants. In one instance, interaction module 248 can then provide access to a merchant device of the inquiring merchant, via a direct communication channel, to a merchant device associated with the recommended merchant recipient.

In another example, interaction module 248 may determine that the merchant asking a question is not a member of a merchant group. Interaction module 248 can associate the merchant with a merchant group, and then proceed to determine a recommended merchant recipient as described above.

Interaction module 248 can receive and transmit other interactions, in addition to the interactions and communications described above.

In at least one example, service computing device(s) 204 can include an instance of training module 250. Service computing device(s) 204 can train and store data model(s) 252. Training module 250 can train data model(s) 252 based on a plurality of training data items such that, given a new input of merchant information 254 associated with a merchant, data model(s) 252 can determine similarities between merchants and/or between a merchant and a merchant group based on that input. In at least one example, training module 250 can receive updated training data and can iteratively update data model(s) 252 based at least in part on the updated training data.

In at least one example, training module 250 can utilize machine learning algorithms to build, modify, or otherwise utilize data model(s) 252. In at least one example, the machine learning algorithms can include memory-based collaborative filtering algorithms, model-based collaborative filtering algorithms, feature-based similarity algorithms, other similarity-based algorithms, etc. In at least one example, training module 250 can access training data for training data model(s) 252. The training data can include merchant information 254, which can include or correspond to data, and/or merchant characteristic information, indicative of characteristics of a plurality of merchants. The training data can also include data associated with groupings of merchants and/or similarity scores associated with individual merchants in a merchant group. In some examples, the groups can be manually formed and labeled. In other examples, the groups can be formed via techniques described herein. Similarly, in at least one example, similarity scores can be manually determined and assigned, or similarity scores can be determined via techniques described herein.

In at least one example, training module 250 can train data model(s) 252 based at least in part on the training data. In such an example, training module 250 can train data model(s) 252 to output a similarity score representative of a similarity between two or more merchants, which can be used for informing merchant group membership. In at least one example, training module 250 can train data model(s) 252 using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Additional details associated with training data model(s) 252 are described below with reference to FIG. 3.

Additional functional components stored in computer-readable media 238 can include operating system 256 for controlling and managing various functions of service computing device(s) 204. In at least one example, computer-readable media 238 can additionally include or maintain other functional components and data, such as other modules and data 258, which can include programs, drivers, etc., and the data used or generated by the functional components. Further, service computing device(s) 204 can include many other logical, programmatic and physical components, of which those described above are merely examples that are related to the discussion herein.

Communication interface(s) 240 can include one or more interfaces and hardware components for enabling communication with various other devices, such as over network(s) 206. For example, communication interface(s) 240 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Service computing device(s) 204 can further be equipped with various input/output (I/O) devices 242. Such I/O devices 242 can include a display, various user interface controls (e.g., buttons, joystick, keyboard, mouse, touch screen, etc.), audio speakers, connection ports and so forth.

Figure 3:
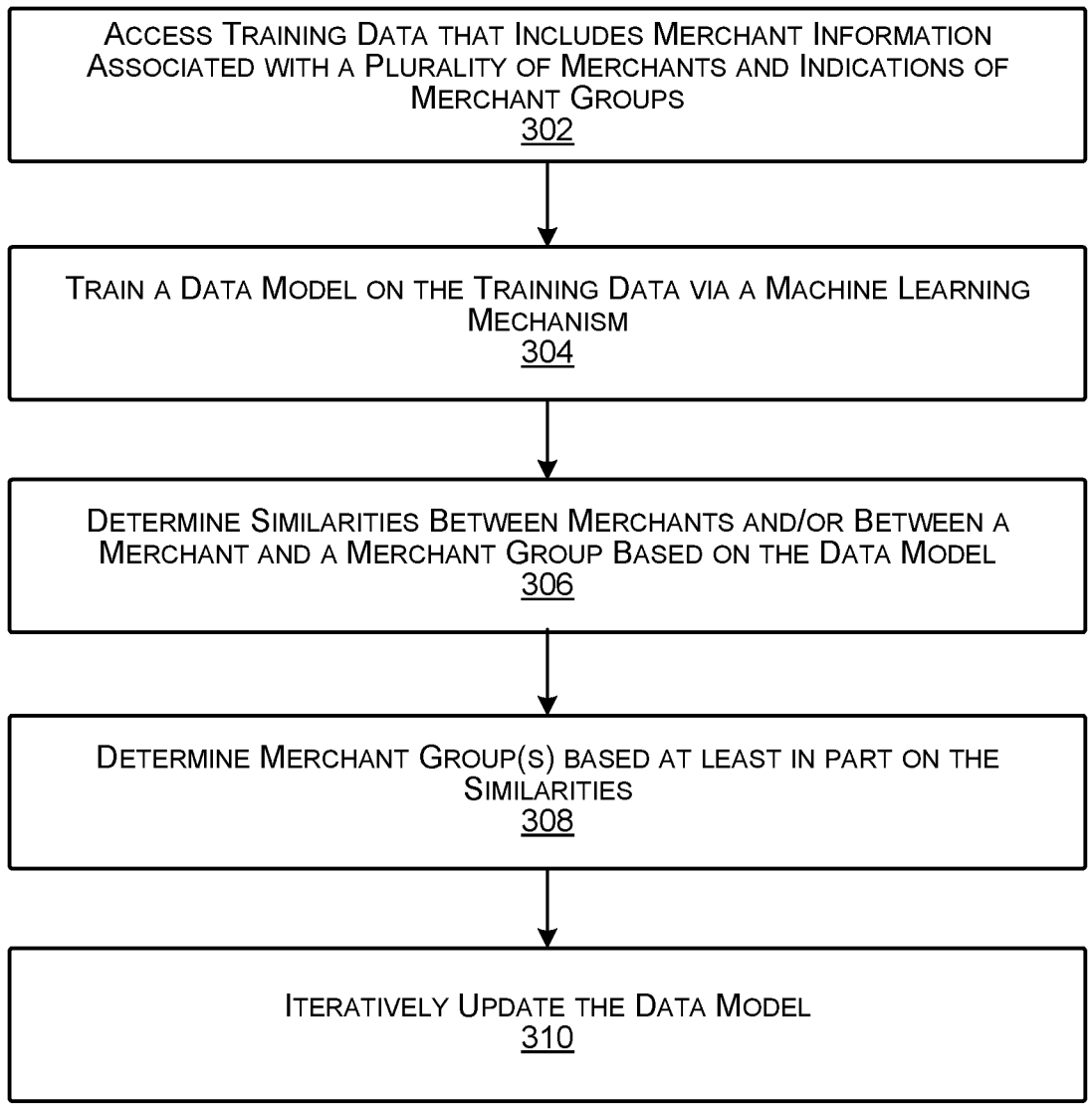
FIG. 3 is a flow diagram illustrating an example process for training a data model to determine similarity between one or more merchants according to some implementations.
Figure 4:
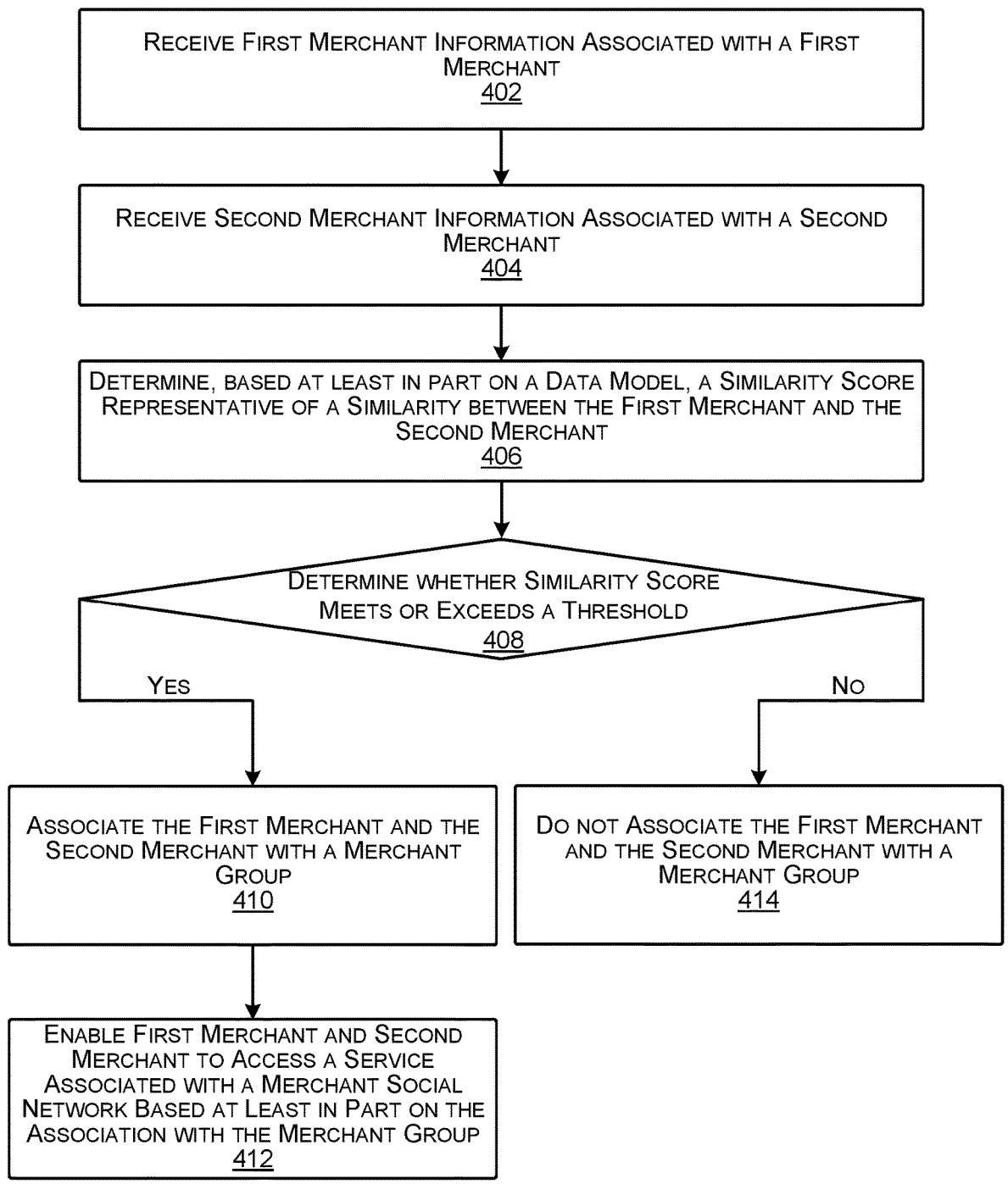
FIG. 4 is a flow diagram illustrating an example process for grouping similar merchants to enable access to merchant social network services according to some implementations.
Figure 5:
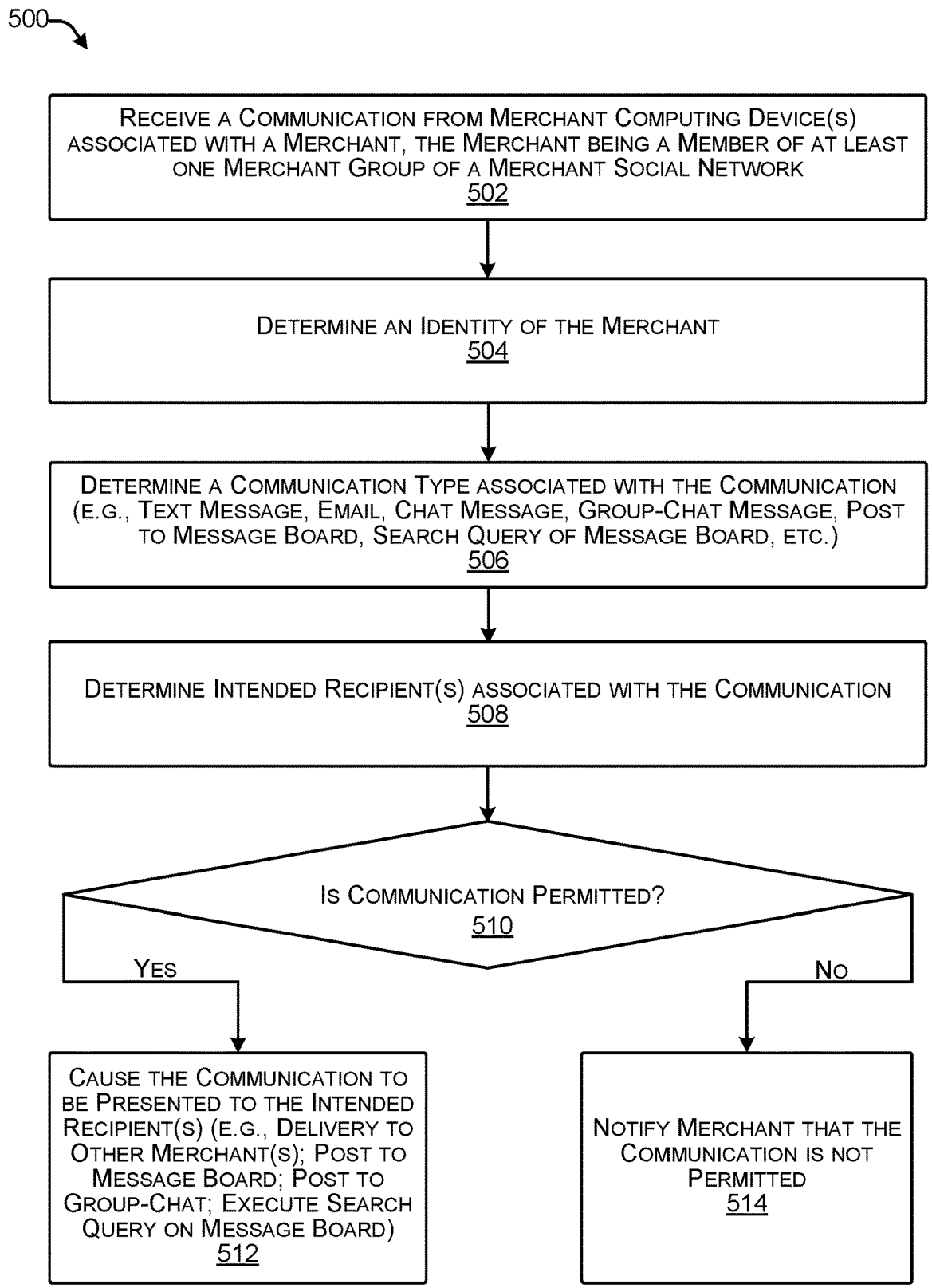
FIG. 5 is a flow diagram illustrating an example process for facilitating merchant communications via a social network for merchants according to some implementations.

FIGS. 3-5 are flow diagrams illustrating example processes according to some implementations. The processes of FIGS. 3-5 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 3-5 can be combined with some or all of the operations illustrated in others of FIGS. 3-5. For discussion purposes, the processes are described with reference to the environments, architectures and devices described in the examples herein, although the processes can be implemented in a wide variety of other environments, architectures and devices.

Various instructions, methods, and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

FIG. 3 is a flow diagram illustrating example process 300 for training a data model for determining similarity between merchants. FIG. 3 is described in the context of the environment and/or device(s) described above with reference to FIG. 2, but is not limited to such environment and/or device(s).

Block 302 illustrates accessing training data that includes merchant information associated with a plurality of merchants and indications of merchant groups. Training module 250 can access training data for training data model(s) 252. The training data can include merchant information 254, which can include or correspond to data indicative of characteristics of a plurality of merchants, which are described above. The training data can also include data associated with groupings of merchants and/or similarity scores associated with individual merchants in a merchant group. In some examples, the groups can be manually formed and labeled. In other examples, the groups can be formed via techniques described herein. Similarly, in at least one example, similarity scores can be manually determined and assigned, or similarity scores can be determined via techniques described herein.

Block 304 illustrates training a data model on the training data via a machine learning mechanism. Training module 250 can train data model(s) 252 based at least in part on the training data. In such an example, training module 250 can train data model(s) 252 to output a similarity score representative of a similarity between two or more merchants, which can be used for informing merchant group membership. In at least one example, training module 250 can train data model(s) 252 using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

Block 306 illustrates determining similarities between merchants and/or between a merchant and a merchant group based on the data model. In at least one example, grouping module 246 can be configured to intelligently determine, by utilization of one or more data models 252 trained by training module 250, a similarity score reflecting a similarity between a merchant and another merchant, or between a merchant and a group of merchants. For instance, grouping module 246 can utilize data model(s) 252 to calculate a similarity score indicative of similarity between the merchant and the other merchant (or the merchant group) based on one or more merchant characteristics (e.g., MCC, location, inventory, etc.). That is, a similarity score is associated with a degree of similarity between a merchant and at least one other merchant (or merchant group).

In at least one example, the similarity score can be indicative of an extent to which merchants share characteristic(s). For instance, a similarity score that meets or exceeds a threshold can indicate that two or more merchants share at least one characteristic. In such an example, a higher similarity score (e.g., close to one on a scale from zero to one) can indicate that the two or more merchants share multiple characteristics. Alternatively, a lower similarity score (e.g., close to zero on a scale from zero to one) can indicate that the two or more merchants do not share any characteristics. Of course, other scales can be used; a scale from zero to one is provided for an example. In some examples, particular characteristics can be weighted such to have different effects on a similarity score. For instance, in a non-limiting example, if merchant category code is valued more than geolocation, merchant category code can be weighted such that it increases the similarity score more so than geolocation. Additionally, or alternatively, in another non-limiting example, geolocation can be irrelevant and may not factor into the similarity analysis. In such an example, geolocation can be associated with a weight such that it does not impact the similarity score.

Block 308 illustrates determining merchant group(s) based at least in part on the similarities. As described above, based at least in part on analyzing merchant information 254, data model(s) 252 can output a similarity score representative of a similarity between a merchant and at least one other merchant. Merchants with a similarity score that meets or exceeds a threshold can be associated with a same merchant group. Additionally, or alternatively, when a merchant and a merchant group have a similarity score that meets or exceeds a threshold, the merchant can be associated with the merchant group. For instance, grouping module 246 can access merchant information 254 associated with two or more merchants and can leverage data model(s) 252 to analyze merchant information 254. Accordingly, grouping module 246 can compare the similarity score with a threshold and, based at least in part on determining that the similarity score meets or exceeds a threshold, grouping module 246 can associate the merchant and the at least one other merchant with a same merchant group. If the at least one other merchant is already part of a merchant group, grouping module 246 can associate the merchant with the merchant group. Additional details associated with grouping merchants can be described below with reference to FIG. 4.

Block 310 illustrates iteratively updating the data model. In at least one example, training module 250 can receive updated training data and can iteratively update data model(s) 252 based at least in part on the updated training data.

FIG. 4 is a flow diagram illustrating an example process 400 for grouping similar merchants into merchant groups to enable access to merchant social network services. FIG. 4 is described in the context of the environment and/or device(s) described above with reference to FIG. 2, but is not limited to such environment and/or device(s).

Block 402 illustrates receiving first merchant information associated with a first merchant. In at least one example, service computing device(s) 204 can receive merchant information 254 associated with a first merchant. As described above, service computing device(s) 204 can store merchant information 254 in a database in computer-readable media 238, as described below. As described above, merchant information 254 can include information associated with a merchant. Merchant information 254 can include one or more merchant characteristics. For instance, merchant information 254 can correspond to merchant characteristics that can include, but are not limited to characteristics specific to a merchant itself, characteristics associated with merchant transactions, characteristics associated with various entities associated with a merchant, characteristics associated with a relationship between a merchant and payment processing service, etc. Merchant information 254 can also be analyzed using data model 252 to define merchant characteristic information associated with merchants. In some examples, merchant characteristic information can be the basis of determining a shared characteristic between merchants. As described above, merchant information 254 can be received from merchant computing device(s) 202 and/or third-party source(s) and/or system(s) 208.

Block 404 illustrates receiving second merchant information associated with a second merchant. In at least one example, service computing device(s) 204 can receive merchant information 254 associated with a second merchant. As described above, service computing device(s) 204 can store merchant information 254 in a database in computer-readable media 238, as described below. As described above, merchant information 254 can include information associated with a merchant. Merchant information 254 can include one or more merchant characteristics. For instance, merchant information 254 can correspond to merchant characteristics that can include, but are not limited to characteristics specific to a merchant itself, characteristics associated with merchant transactions, characteristics associated with various entities associated with a merchant, characteristics associated with a relationship between a merchant and payment processing service, etc. As described above, merchant information 254 can be received from merchant computing device(s) 202 and/or third-party source(s) and/or system(s) 208.

Block 406 illustrates determining, based at least in part on a data model, a similarity score representative of a similarity between the first merchant and the second merchant. In at least one example, grouping module 246 can be configured to intelligently determine, by utilization of one or more data models 252 trained by training module 250, a similarity score reflecting a similarity between the first merchant and the second merchant. In some examples, the second merchant can be representative of a merchant group.

In at least one example, grouping module 246 can access merchant information 254 associated with the first merchant and merchant information 254 associated with the second merchant, and can analyze merchant information 254 with data model(s) 252. As described above, data model(s) 252 can be trained to output a similarity score indicative of similarity between the first merchant and the second merchant (which can be representative of a merchant group) based on one or more merchant characteristics (e.g., MCC, location, inventory, etc.). That is, grouping module 246 can leverage data model(s) 252 to determine a similarity score that is associated with a degree of similarity between a merchant and at least one other merchant (or merchant group).

Block 408 illustrates determining whether a similarity score meets or exceeds a threshold. In at least one example, grouping module 246 can compare the similarity score with a threshold.

Block 410 illustrates associating the first merchant and the second merchant with a merchant group based on determining that the similarity score meets or exceeds the threshold. Merchants with a similarity score that meets or exceeds a threshold can be associated with a same merchant group. Additionally, or alternatively, when a merchant and a merchant group have a similarity score that meets or exceeds a threshold, the merchant can be associated with the merchant group. Accordingly, in at least one example, grouping module 246 can compare the similarity score with a threshold and, based at least in part on determining that the similarity score meets or exceeds a threshold, grouping module 246 can associate the first merchant and the second merchant with a same merchant group. In some examples, the merchant group can be a newly formed merchant group (with the first merchant and the second merchant). In other examples, if the first merchant or the second merchant is already part of a merchant group, grouping module 246 can associate the other merchant with the same merchant group.

In at least one example, the grouping module 246 can add the merchant(s) to the merchant group by adding an indicator of such merchant group to respective merchant profile(s) of the merchant(s). Additionally and/or alternatively, the grouping module 246 can add the merchant(s) to the merchant group by mapping, or otherwise associating, merchant profile(s) associated with the merchant(s) to the merchant group.

In at least one example, adding the merchant to the merchant group can occur without receiving an election from the merchant to join. For example, grouping module 246 can add a merchant to a merchant group automatically. Alternatively, in some examples, a merchant can elect to join a merchant group prior to the merchant being added to the merchant group. In such examples, grouping module 246 can send, to a device operated by the merchant (e.g., merchant computing device(s) 202), an indication of eligibility to join at least one merchant group together with an indication of one or more steps the merchant can follow to affirmatively elect to join merchant group (e.g., via interaction with UI 217). If grouping module 246 receives an indication of an election to join the merchant group, grouping module 246 can associate the merchant with the merchant group.

Block 412 illustrates enabling the first merchant and second merchant to access a service associated with a merchant social network based at least in part on the association with the merchant group. In at least one example, based on the association between the merchants, grouping module 246 can add merchant(s) to a particular merchant group. When merchants are associated with (or are "members of") a merchant group, merchants can use one or more social networking services to interact and/or exchange information. For example, merchants can communicate with each other in different ways, using different communication types. For instance, a merchant in a merchant group can (1) send a direct message to another member of the merchant group, (2) post to a message board or other internet forum associated with the merchant group, (3) engage in a group chat with other members of the merchant group, (4) browse or search the merchant group message board content, etc. The content of the various communications can be recommendations, announcements, questions, advertisements, etc. Additional details associated with social networking services that are availed to grouped merchants are described below with respect to FIG. 5.

Block 414 illustrates refraining from associating the first merchant and the second merchant with a merchant group based on determining that the similarity score does not meet or exceed the threshold. Based at least in part on determining that the similarity score does not meet or exceed the threshold, grouping module 246 can refrain from associating the first merchant and the second merchant with a same merchant group.

FIG. 5 is a flow diagram illustrating an example process 500 for facilitating interactions via a merchant social network. FIG. 5 is described in the context of the environment and/or device(s) described above with reference to FIG. 2, but is not limited to such environment and/or device(s).

Block 502 illustrates receiving a communication from merchant computing device(s) associated with a merchant who is a member of at least one merchant group of a merchant social network. In at least one example, interaction module 248 can receive a communication from merchant computing device(s) 202. For example, a communication can include content such as a recommendation, an announcement, a question, an advertisement, etc. Examples of the type(s) of communication are (1) a direct message to another member of the merchant group, (2) a post to a message board or other internet forum associated with the merchant group, (3) a message in a group chat with other members of the merchant group, and/or (4) a request to browse or search the merchant group message board content, etc. A merchant can be associated with (or made a member of) a merchant group by a grouping module 246 of the service computing device(s) 204, as described above in relation to FIG. 4.

Block 504 illustrates determining the identity of the merchant who sent the communication. For instance, interaction module 248 can determine the merchant who sent the communication based at least in part on metadata associated with the communication having an indicator of identity of the merchant who sent the communication. In at least one example, the indicator can be a merchant identifier, a merchant computing device address, etc.

Block 506 illustrates determining a communication type associated with the communication. In at least one example, interaction module 248 can determine the communication type a merchant intends to use (e.g., text message, email, chat message, group chat message, post to message board, search query of message board, etc.) based at least in part on data or metadata associated with the communication having an indicator or communication type. In another example, interaction module 248 can determine the communication type to use when the sender does not specify which communication type is intended and/or requests assistance of payment processing service to determine the communication type. For example, the interaction module may determine that the optimum communication channel for the recommended merchant at a particular time (during working hours) is through the merchant POS device, while during the evening the best means of communication is via email or text message.

Block 508 illustrates determining intended recipient(s) associated with the communication. For the purpose of this discussion, an intended recipient can be an individual merchant and/or merchant group. In at least one example, interaction module 248 can determine whether the communication is directed to individual merchant(s) and/or merchant group(s) based at least in part on the communication type.

In some examples, membership in the social network for merchants described herein can enable a merchant to send a communication to individual merchant(s) in merchant group (s) to which the merchant belongs. For instance, the merchant can send a direct message to an individual merchant that is associated with a same merchant group as the merchant. In such examples, interaction module 248 can determine the intended recipient(s) of the communication based at least in part on the communication type (e.g., email, text, etc.) and/or fields of the communication (e.g., "to," addressee, etc.).

In other examples, the merchant can send a communication that is directed to each member of a merchant group to which the merchant belongs. For instance, the merchant can post to a message board associated with the merchant group. In an example, interaction module 248 can determine that the communication type is a type intended for a merchant group (e.g., a post to a message board, a group chat, etc.). In some examples, interaction module 248 can leverage the identity of the merchant to determine with which merchant group(s) the merchant is associated. For instance, interaction module 248 can determine the relevant merchant group(s) of the merchant based on the merchant group(s) with which the merchant is associated. In some examples, absent any indication from the merchant, interaction module 248 can determine that all merchant group(s) with which the merchant is associated are the intended recipient(s).

In other examples, the communication can be directed to a subset of the one or more merchant groups. In at least one example, the merchant can specify one or more merchant groups that are the intended recipient(s) of the communication. In such an example, interaction module 248 can determine the relevant merchant group(s) based at least in part on (1) metadata associated with the communication having an indicator of the merchant group(s) from which the merchant is sending the communication (e.g., an email template generated when the merchant was active on the message board for a particular merchant group), (2) a selection by the merchant of a control of UI 217 indicating the relevant merchant group, and/or (3) entry of the merchant group by the merchant into a text field of UI 217.

Figure 6:
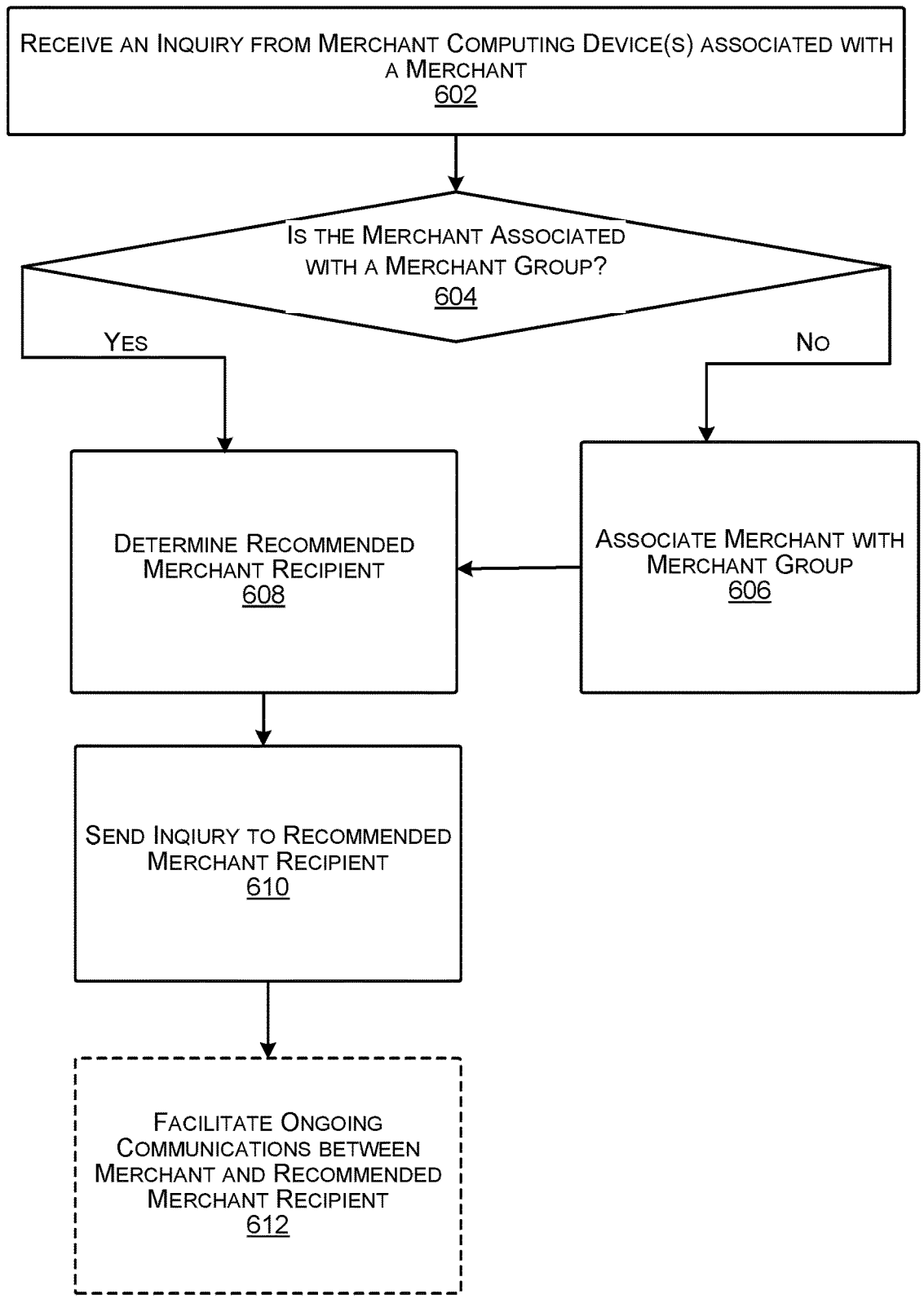
FIG. 6 is a flow diagram illustrating an example process for determining a recommended merchant recipient to answer a merchant inquiry according to some implementations.

In another example, determining intended recipient(s) associated with the communication comprises determining a recipient when the recipient merchant or merchant group is unknown. For instance interaction module 248 can determine an intended recipient based on a search of communication records, for example, for the relevant merchant group(s). That is, interaction module 248 can identify an intended recipient based on previous communication records and can recommend an intended recipient. In at least one example, an intended recipient can be the support team. FIG. 6, described below, illustrates an example process for determining a recommended merchant recipient responsive to receiving an inquiry that is not directed to any particular merchant and can lack a particular intended recipient. In that example, interaction module 248 determines a recommended merchant recipient to which to direct the inquiry by, for instance, accessing merchant information 254 associated with the inquiring merchant and the plurality of other merchants associated with the merchant group(s), analyzing similarity between the inquiring merchant and the plurality of other merchants, and identify a recommended merchant recipient to whom to direct the inquiry.

Block 510 illustrates determining whether the communication is permitted. In some examples, interaction module 248 can validate that the merchant is permitted to communicate with the intended merchant(s) and/or merchant group(s). For instance, in at least one example, interaction module 248 can access a merchant profile associated with the merchant to determine any restrictions on merchant interactions with other members of the merchant group(s) or the payment processing service. If the merchant is permitted to communicate with the intended merchant(s) and/or merchant group(s), interaction module 248 can cause the communication to be presented to the intended recipient(s), as illustrated in block 512. In at least one example, interaction module 248 can route the communication to the intended recipient(s) (e.g., merchant computing devices operated by the intended recipient(s)) and can cause the communication to be presented to the intended recipient(s).

In at least one example the communication can be a direct message (e.g., text message, email, chat message, etc.) and interaction module 248 can transmit the direct message to one or more of the intended recipient(s). Interaction module 248 can transmit the direct message to the merchant computing device(s) of the intended recipient(s) and/or the direct message can be surfaced to the intended recipient(s) through a website associated with payment processing service (e.g., via UI for social network access 217). Additionally, in at least one example, interaction module 248 can transmit a message to the merchant who sent the communication indicating that the email has been transmitted to the intended recipient(s).

In another example, the communication can be a post to a message board of a merchant group. Interaction module 248 can cause the post to be presented via the message board and can send a notification to members of the particular merchant group indicating that a new post has been added to the message board. In at least one example, the message board can be accessible via UI for social network access 217. Additionally, in at least one example, interaction module 248 can transmit a message to the merchant who sent the communication indicating that the post has been posted to the message board.

In another example, the communication can be a message intended to be displayed in a group chat. Interaction module 248 can cause presentation of the communication either on merchant computing device(s) 202 associated with the recommended or intended recipient(s) and/or on a webpage associated with the payment processing service (e.g., via UI for social network access 217).

In another example, the communication can be a search query that a merchant would like to implement on a message board. Interaction module 248 can execute the query on the message board content, for instance, or on other social network content for which the merchant is authorized by service computing device(s) 204 to access. Interaction module 248 can cause presentation of the search results to the merchant who made the search query, either on merchant computing device(s) 202 associated with the merchant and/or on a webpage associated with the payment processing service (e.g., via UI for social network access 217).

If the merchant is not permitted to communicate with the intended merchant(s) and/or merchant group(s), interaction module 248 can reject the communication and can notify the merchant that the communication is not permitted, as illustrated in block 514. That is, interaction module 248 can send an indication to merchant computing device(s) 202 notifying the merchant that the communication failed (e.g., via UI for social network access 217).

FIG. 6 is a flow diagram illustrating an example process 600 determining a recommended merchant recipient to answer a merchant inquiry. FIG. 6 is described in the context of the environment and/or device(s) described above with reference to FIG. 2, but is not limited to such environment and/or device(s).

Block 602 illustrates receiving an inquiry from merchant computing device(s) associated with an inquiring merchant. In at least one example, interaction module 248 can receive the inquiry from merchant computing device(s) 202. The inquiry can include a question. Examples of the type(s) of inquiry can include (1) a question about operating a merchant computing device, (2) a question specific to the characteristics of the inquiring merchant (e.g., location, merchant type, inventory, etc.), etc.

Block 604 illustrates determining whether the inquiring merchant is already associated with a merchant group. In some examples, interaction module 248 can validate that the merchant is a member of any merchant group(s). For instance, in at least one example, interaction module 248 can access a merchant profile associated with the merchant to determine membership in merchant group(s). Interaction module 248 can determine, from the merchant profile(s), if the merchant has an indicator indicating membership in a merchant group. Interaction module 248 can also determine from the merchant profile(s) if there are mappings or other associations between the merchant and a merchant group.

Block 606 illustrates associating the inquiring merchant with merchant group(s) if the merchant is not already associated with a merchant group. For example, a merchant can be associated with (or made a member of) a merchant group by a grouping module 246 of the service computing device(s) 204, as described above in relation to FIG. 4.

Block 608 illustrates, based at least in part on the inquiring member is determined to be associated with merchant group(s) or once the inquiring member is associated with merchant group(s), determining a recommended merchant recipient to which to direct the inquiry. Interaction module 248 can access merchant information 254 associated with the inquiring merchant and the plurality of other merchants associated with the merchant group(s). Interaction module 248 can leverage data model(s) 252 to analyze merchant information 254 of the inquiring merchant and the plurality of other merchants. Data model(s) 252 can output similarity scores representative of a similarity between the inquiring merchant and each of the plurality of other merchants. Interaction module 248 can compare the similarity scores and identify (e.g., by ranking the similarity scores and identifying the top-ranked merchant) a recommended merchant recipient to whom to direct the inquiry.

Additionally, or alternatively, interaction module 248 can determine a recommended merchant recipient to answer the question by analyzing previous communications from, to, between, and/or among the plurality of merchants associated with the merchant group(s). Based on the question and the previous communications, interaction module 248 can identify at least one recommended merchant recipient of the plurality of merchants.

Block 610 illustrates sending the inquiry of the inquiring merchant to the recommended merchant recipient. In one example, payment processing service can cause the inquiry to be sent to a merchant computing device of the recommended merchant recipient to be presented on merchant computing device of the recommended merchant recipient. In an additional and/or alternative example, the inquiry can be surfaced to the recommended merchant recipient through a website associated with payment processing service.

Block 612 illustrates payment processing service facilitating ongoing communications between the inquiring merchant and the recommended recipient. In one example, interaction module 246 can provision the merchant social network to enable communication by enabling a direct communication channel between the inquiring merchant and the recommended recipient and/or by facilitating access by the direct communication channel to a merchant computing device of the recommended recipient.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    receiving, by a payment processing service and from an instance of a merchant application executing on a merchant device of a merchant, transaction data of a transaction performed between the merchant and one or more customers, wherein the instance of the merchant application is provided by the payment processing service for configuring the merchant device as a point-of-sale (POS) terminal to communicate the transaction data over a network to the payment processing service;
    processing, by the payment processing service, a payment associated with the transaction based at least in part on the transaction data;
    determining, by the payment processing service, based on analyzing at least the transaction data, a shared characteristic associated with the merchant and a merchant group;
    associating, by the payment processing service, the merchant with the merchant group;
    provisioning, by the payment processing service, a merchant social network based on the merchant group, wherein the merchant social network provides the instance of the merchant application with access to one or more communication services within the merchant group;
    based at least in part on receiving a first communication from the merchant, activating, by the payment processing service, the one or more communication services between the merchant and the merchant group via the merchant social network, wherein the one or more communication services enable near real-time communications between the merchant and another merchant included in the merchant group;
    causing presentation of, by the payment processing service, a user interface including an indication of the merchant social network;
    receiving, by the payment processing service, and from one or more computing devices of at least one a social media platform, review platform, or technical support platform, additional information associated with the merchant;
    responsive to receiving the additional information, determining, by the payment processing service, that the merchant is no longer associated with the shared characteristic; and
    based at least in part on the indication, removing, by the payment processing service, the merchant from the merchant group and deactivating the one or more communication services while retaining the one or more communication services as active between other merchants in the merchant group.

2. The method of claim 1, wherein the merchant comprises a first merchant, and wherein the communication comprises a first communication, wherein the user interface further includes one or more controls interactable to communicate via the merchant social network using the one or more communication services, the method further comprising:
    prior to removing the merchant from the merchant group and deactivating the one or more communication services:
        receiving, by the payment processing service and based at least in part on an interaction with a control of the one or more controls, a second communication from the merchant associated with a support request;
        identifying, by the payment processing service, information regarding the support request, wherein the information is associated with the merchant group; and
        transmitting, by the payment processing service to a device operated by a second merchant of the merchant group, the information regarding the second communication associated with the support request.

3. The method of claim 1, further comprising, prior to removing the merchant from the merchant group and deactivating the one or more communication services:
    receiving, by the payment processing service and via the user interface, a message for the merchant group;
    presenting, by the payment processing service, the message via an electronic message board, wherein the presenting is based at least in part on the merchant being included in the merchant group; and
    notifying, by the payment processing service, at least one other merchant included in the merchant group that the message has been presented.

4. The method of claim 1, further comprising, prior to removing the merchant from the merchant group and deactivating the one or more communication services:
    transmitting, by the payment processing service and to individual devices operated by respective members of the merchant group, a message concerning a topic relevant to the merchant group.

5. The method of claim 1, wherein the shared characteristic excludes location.

6. The method of claim 1, wherein the shared characteristic is further based on other data stored by the payment processing service, the other data comprising data provided by at least one of:
    at least one merchant,
    at least one third-party information source, or
    at least one support service record.

7. A system associated with a payment processing service, the system comprising:

one or more processors; and
one or more computer-readable media storing instructions executable by the one or more processors, wherein the instructions program the one or more processors to:
receive, by the payment processing service and from an instance of a merchant application executing on a merchant device associated with a merchant of a plurality of merchants, transaction data of a transaction performed between the merchant and one or more customers, wherein the instance of the merchant application is provided by the payment processing service for configuring the merchant device as a point-of-sale (POS) terminal to communicate the transaction data over a network to the payment processing service;
process, by the payment processing service, a payment for the transaction based at least in part on the transaction data;
determine, by the payment processing service, and based on analyzing at least the transaction data, a similarity between the merchant and a merchant group;
associate, by the payment processing service, the merchant with the merchant group;
provision, by the payment processing service and based at least on the merchant group, a merchant social network, wherein the merchant social network provides the instance of the merchant application with access to one or more communication services for communications within the merchant group;
based at least in part on receiving a communication from the merchant, activate, by the payment processing service and via the merchant social network, one or more communication services, wherein the one or more communication services enable near real-time communications between the merchant and another merchant included in the merchant group;
cause presentation of, by the payment processing service, a user interface including an indication of the merchant social network;
receive, by the payment processing service, and from one or more computing devices of at least one of a social media platform, review platform, or technical support platform, additional information associated with the merchant;
responsive to receiving the additional information, determine, by the payment processing service, an absence of the similarity between the merchant and the merchant group; and
based at least in part on the indication, remove, by the payment processing service, the merchant from the merchant group and deactivating the one or more communication services while retaining the one or more communication services as active between other merchants in the merchant group.

8. The system of claim 7, wherein the user interface further includes one or more controls interactable to communicate via the merchant social network using the one or more communication services, and wherein a communication service of the one or more communication services is at least one of direct messaging or posting to a message board associated with the merchant group.

9. The system of claim 7, wherein associating the merchant with the merchant group comprises automatically adding the merchant to the merchant group without receiving input from at least one of an agent associated with the payment processing service or the merchant.

10. The system of claim 7, wherein associating the merchant with the merchant group comprises:
presenting, by the payment processing service, an option to join the merchant group via at least one of the merchant device or a website associated with the payment processing service;
receiving, by the payment processing service, an indication of an election by the merchant to join the merchant group; and
adding, by the payment processing service, the merchant to the merchant group.

11. The system of claim 7, wherein analyzing the transaction comprises analyzing the transaction data with a data model and, prior to analyzing the transaction data with the data model, the instructions further program the one or more processors to:
access, by the payment processing service, merchant information associated with the plurality of merchants, groupings of such merchants, and similarity scores previously determined for such merchants; and
train, by the payment processing service, the data model using at least one machine learning mechanism, the data model configured to output indications of similarity between individual merchants of the plurality of merchants.

12. One or more non-transitory computer-readable media storing instructions executable by one or more processors, wherein the instructions program the one or more processors to:
receive, by a payment processing service and from an instance of a merchant application executing on a merchant device of a merchant, transaction data of a transaction performed between the merchant and one or more customers, wherein the instance of the merchant application is provided by the payment processing service for configuring the merchant device as a point-of-sale (POS) terminal to communicate the transaction data over a network to the payment processing service;
process, by the payment processing service, a payment associated with the transaction based at least in part on the transaction data;
determine, by the payment processing service, and based on analyzing at least the transaction data, a shared characteristic associated with the merchant and a merchant group;
associate, by the payment processing service, the merchant with the merchant group;
provision, by the payment processing service, a merchant social network based on the merchant group, wherein the merchant social network provides the instance of the merchant application with access to one or more communication services within the merchant group;
based at least in part on receiving a communication from the merchant, activate, by the payment processing service, the one or more communication services between the merchant and the merchant group via the merchant social network, wherein the one or more communication services enable near real-time communications between the merchant and another merchant included in the merchant group; and
cause presentation of, by the payment processing service, a user interface including an indication of the merchant social network;
receive, by the payment processing service, and from one or more computing devices of at least one of a social media platform, review platform, or technical support platform, additional information associated with the merchant;

responsive to receiving the additional information, determine, by the payment processing service, that the merchant is no longer associated with the shared characteristic; and based at least in part on the indication, remove, by the payment processing service, the merchant from the merchant group and deactivating the one or more communication services while retaining the one or more communication services as active between other merchants in the merchant group.

13. The one or more non-transitory computer-readable media of claim 12, wherein associating the merchant with the merchant group is based at least in part on a similarity score meeting or exceeding a threshold, wherein the similarity score is based at least in part on the shared characteristic.

14. The one or more non-transitory computer-readable media of claim 12, wherein activating the one or more communication services comprises at least one of activating the near real-time communications between the merchant and at least one other member of the merchant group or activating access by the merchant to information posted to an internet forum by other members of the merchant group.

15. The one or more non-transitory computer-readable media of claim 14, wherein the near real-time communications comprise at least one of near real-time text communication or email communication.

16. The one or more non-transitory computer-readable media of claim 12, wherein the instructions further program the one or more processors to provide, by the payment processing service, an incentive to a member of the merchant group based at least in part on the member answering at least one question from another member of the merchant group.

17. The one or more non-transitory computer-readable media of claim 12, wherein the merchant comprises a first merchant, and wherein the instructions further program the one or more processors to:

receive, by the payment processing service and from the instance of the merchant application executing on the merchant device, a near real-time communication associated with a support request;

identify, by the payment processing service, information regarding the support request, wherein the information is associated with the merchant group; and transmit, by the payment processing service to a device operated by a second merchant of the merchant group, the information regarding the near real-time communication associated with the support request.

18. The one or more non-transitory computer-readable media of claim 17, wherein identifying the information regarding the support request comprises performing natural language processing of past communications between one or more merchants of the merchant group and the payment processing service, or text-searching electronic notes of support agents associated with the payment processing service.

19. The one or more non-transitory computer-readable media of claim 17, wherein the additional information associated with the merchant is received from one or more computing devices of a social media platform.

20. The one or more non-transitory computer-readable media of claim 17, wherein the additional information associated with the merchant is received from one or more computing devices of the review platform.

* * * * *